United States Patent
Matsubayashi et al.

(10) Patent No.: US 6,473,754 B1
(45) Date of Patent: Oct. 29, 2002

(54) METHOD AND SYSTEM FOR EXTRACTING CHARACTERISTIC STRING, METHOD AND SYSTEM FOR SEARCHING FOR RELEVANT DOCUMENT USING THE SAME, STORAGE MEDIUM FOR STORING CHARACTERISTIC STRING EXTRACTION PROGRAM, AND STORAGE MEDIUM FOR STORING RELEVANT DOCUMENT SEARCHING PROGRAM

(75) Inventors: Tadataka Matsubayashi, Osaka; Katsumi Tada, Kawasaki; Takuya Okamoto, Sagamihara; Natsuko Sugaya, Kawasaki; Yasushi Kawashimo, Hirakata, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/320,558

(22) Filed: May 27, 1999

(30) Foreign Application Priority Data

May 29, 1998 (JP) .......................................... 10-148721

(51) Int. Cl.$^7$ .............................................. G06F 17/30
(52) U.S. Cl. ............................ 707/5; 707/3; 707/104.1; 707/500
(58) Field of Search ................................ 382/177, 203; 707/3, 104, 2, 5, 104.1, 500

(56) References Cited

U.S. PATENT DOCUMENTS

| | | | |
|---|---|---|---|
| 5,418,951 A | | 5/1995 | Damashek ...................... 707/5 |
| 5,680,612 A | * | 10/1997 | Asada et al. ................. 395/613 |
| 5,745,745 A | * | 4/1998 | Tada et al. ................... 395/601 |
| 5,991,755 A | * | 11/1999 | Noguchi et al. ................ 707/3 |
| 6,041,323 A | * | 3/2000 | Kubota ........................... 707/5 |
| 6,173,253 B1 | * | 1/2001 | Abe et al. ..................... 704/10 |

FOREIGN PATENT DOCUMENTS

| | | |
|---|---|---|
| JP | 6435627 | 2/1989 |
| JP | 6110948 | 4/1994 |
| JP | 07078182 | 3/1995 |
| JP | 07319882 | 12/1995 |
| JP | 08095982 | 4/1996 |
| JP | 08153121 | 6/1996 |
| JP | 08202737 | 8/1996 |
| JP | 08320873 | 12/1996 |
| JP | 08329112 | 12/1996 |
| JP | 08335222 | 12/1996 |
| JP | 09311871 | 12/1997 |

OTHER PUBLICATIONS

Y. Ogawa, An Efficient Document Ranking Retrieval Method using n–gram–based Signature Files, A Journal of the Information Processing Society vol. 38, No. 11, Nov. 1997, pp. 2286–2297.

* cited by examiner

Primary Examiner—Greta L. Robinson
(74) Attorney, Agent, or Firm—Antonelli, Terry, Stout & Kraus, LLP.

(57) ABSTRACT

A method for extracting features in contents of a document without using a word dictionary and a system using the method for accurately searching for a relevant document or documents at high speed. The method includes steps of storing character strings present in a text in a text database and possibilities appearing at boundaries of words in the text in the form of an occurrence probability file, storing occurrence frequencies of the character strings in the text as an occurrence frequency file, extracting characteristic strings from a text spcified by a user with use of the occurrence probability file, and counting occurrence frequencies thereof in the user-specified text. The method calculates similarities to the user-specified text with use of the occurrence frequency file and the occurrence frequencies in the user-specified text.

22 Claims, 25 Drawing Sheets

FIG. 2

| No. | 1-gram | OCCURRENCE FREQUENCY | HEAD-POSITION FREQUENCY | TAIL-POSITION FREQUENCY |
|---|---|---|---|---|
| 1 | ー | 62,318 | 0 | 13,480 |
| 2 | ナ | 28,090 | 2,653 | 2,079 |
| 3 | マ | 43,300 | 15,235 | 6,179 |
| 4 | 携 | 4,740 | 768 | 492 |
| 5 | 帯 | 4,703 | 530 | 687 |
| 6 | 題 | 36,338 | 733 | 32,342 |
| 7 | 電 | 38,317 | 13,794 | 3,218 |
| 8 | 問 | 46,216 | 19,205 | 11,884 |
| 9 | 用 | 59,987 | 5,132 | 33,600 |
| 10 | 話 | 18,416 | 1,105 | 6,353 |

| No. | 1-gram | HEAD-POSITION PROBABILITY | TAIL-POSITION PROBABLITY |
|---|---|---|---|
| 1 | ー | 0.00 | 0.22 |
| 2 | ナ | 0.09 | 0.07 |
| 3 | マ | 0.35 | 0.14 |
| 4 | 携 | 0.16 | 0.10 |
| 5 | 帯 | 0.11 | 0.15 |
| 6 | 題 | 0.02 | 0.89 |
| 7 | 電 | 0.36 | 0.08 |
| 8 | 問 | 0.42 | 0.26 |
| 9 | 用 | 0.09 | 0.56 |
| 10 | 話 | 0.06 | 0.34 |

~300

| No. | 1-gram | OCCURRENCE FREQUENCY | HEAD-POSITION FREQUENCY | TAIL-POSITION FREQUENCY | INDEPENDENT FREQUENCY |
|---|---|---|---|---|---|
| 1 | ー | 62,318 | 0 | 13,480 | 0 |
| 2 | ナ | 28,090 | 2,653 | 2,079 | 0 |
| 3 | マ | 43,300 | 15,235 | 6,179 | 0 |
| 4 | 携 | 4,740 | 768 | 492 | 42 |
| 5 | 帯 | 4,703 | 530 | 687 | 26 |
| 6 | 題 | 36,338 | 733 | 32,342 | 332 |
| 7 | 電 | 38,317 | 13,794 | 3,218 | 218 |
| 8 | 問 | 46,216 | 19,205 | 11,884 | 884 |
| 9 | 用 | 59,987 | 5,132 | 33,600 | 768 |
| 10 | 話 | 18,416 | 1,105 | 6,353 | 211 |
| 11 | ナー | 3,867 | 65 | 3,040 | 0 |
| 12 | マナ | 122 | 99 | 4 | 0 |
| 13 | 携帯 | 462 | 419 | 52 | 48 |
| 14 | 使用 | 2,704 | 2,156 | 1,517 | 517 |
| 15 | 帯電 | 269 | 14 | 4 | 4 |
| 16 | 電話 | 5,283 | 2,538 | 3,053 | 1,298 |
| 17 | 問題 | 29,095 | 15,280 | 25,547 | 13,157 |

FIG. 6

| No. | n-gram | HEAD-POSITION PROBABILITY | TAIL-POSITION PROBABILITY | INDEPENDENT PROBABILITY |
|---|---|---|---|---|
| 1 | 一 | 0.00 | 0.22 | 0.00 |
| 2 | ナ | 0.09 | 0.07 | 0.00 |
| 3 | マ | 0.35 | 0.14 | 0.00 |
| 4 | 携 | 0.16 | 0.10 | 0.01 |
| 5 | 使 | 0.69 | 0.70 | 0.12 |
| 6 | 帯 | 0.11 | 0.15 | 0.01 |
| 7 | 題 | 0.02 | 0.89 | 0.01 |
| 8 | 電 | 0.36 | 0.08 | 0.01 |
| 9 | 問 | 0.42 | 0.26 | 0.02 |
| 10 | 用 | 0.09 | 0.56 | 0.01 |
| 11 | 話 | 0.06 | 0.34 | 0.01 |
| 12 | ナ一 | 0.02 | 0.79 | 0.00 |
| 13 | マナ | 0.81 | 0.03 | 0.00 |
| 14 | 携帯 | 0.90 | 0.11 | 0.10 |
| 15 | 使用 | 0.80 | 0.56 | 0.19 |
| 16 | 帯電 | 0.05 | 0.01 | 0.01 |
| 17 | 電話 | 0.48 | 0.58 | 0.25 |
| 18 | 問題 | 0.53 | 0.88 | 0.45 |

OCCURRENCE PROBABILITY FILE

| No. | n-gram | HEAD-POSITION PROBABILITY | TAIL-POSITION PROBABILITY | INDEPENDENT PROBABILITY |
|---|---|---|---|---|
| 1 | 一 | 0.00 | 0.22 | 0.00 |
| 2 | ナ | 0.09 | 0.07 | 0.00 |
| 3 | マ | 0.35 | 0.14 | 0.00 |
| 4 | 携 | 0.16 | 0.10 | 0.01 |
| 5 | 使 | 0.69 | 0.70 | 0.12 |
| 6 | 帯 | 0.11 | 0.15 | 0.01 |
| 7 | 題 | 0.02 | 0.89 | 0.01 |
| 8 | 電 | 0.36 | 0.08 | 0.01 |
| 9 | 問 | 0.42 | 0.26 | 0.02 |
| 10 | 用 | 0.09 | 0.56 | 0.01 |
| 11 | 話 | 0.06 | 0.34 | 0.01 |
| 12 | ナー | 0.02 | 0.79 | 0.00 |
| 13 | マナ | 0.81 | 0.03 | 0.00 |
| 14 | 携帯 | 0.90 | 0.11 | 0.10 |
| 15 | 使用 | 0.80 | 0.56 | 0.19 |
| 16 | 帯電 | 0.05 | 0.01 | 0.01 |
| 17 | 電話 | 0.48 | 0.58 | 0.25 |
| 18 | 問題 | 0.53 | 0.88 | 0.45 |

600

OCCURRENCE PROBABILITIES FOR CALCULATION OF DIVISION PROBABILITY P(1)

| | HEAD-POSITION PROBABILITY | TAIL-POSITION PROBABILITY | INDEPENDENT PROBABILITY |
|---|---|---|---|
| 携 | 0.16 | 0.10 | 0.01 |
| 携 | 0.11 | 0.15 | 0.01 |

× → DIVISION PROBABILITY P(1) = 0.001

DIVISION PROBABILITY CALCULATION POSITION (I=1)

SINGLE CHARACTER TYPE STRING (LENGTH LN=4) 携 帯 電 話

DIVISION PROBABILITY CALCULATION POSITION (I+1=2)

OCCURRENCE PROBABILITIES FOR CALCULATION OF DIVISION PROBABILITY P(2)

| | HEAD-POSITION PROBABILITY | TAIL-POSITION PROBABILITY | INDEPENDENT PROBABILITY |
|---|---|---|---|
| 携帯 | 0.90 | 0.11 | 0.10 |
| 電 | 0.36 | 0.08 | 0.01 |

× → DIVISION PROBABILITY P(2) = 0.036

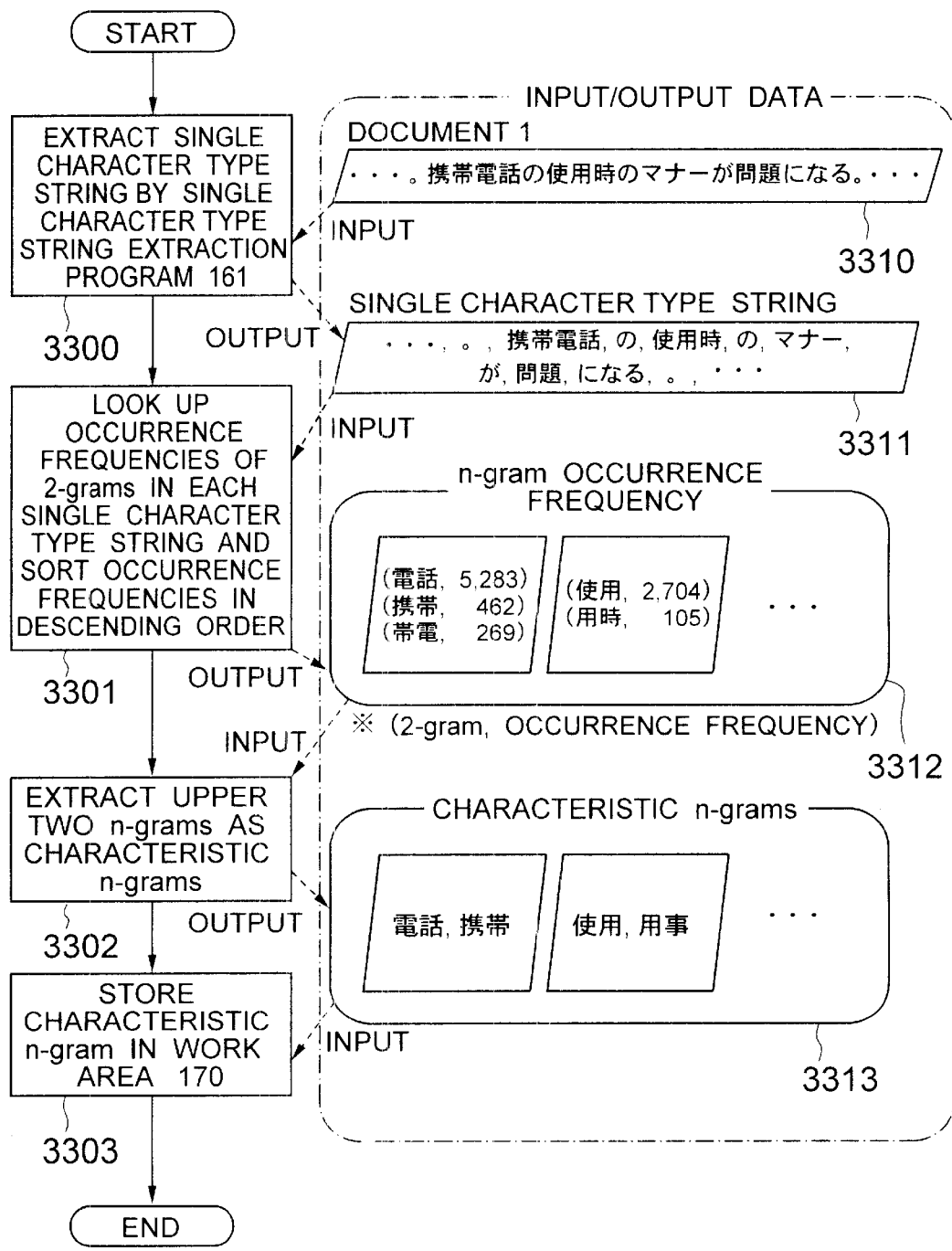

METHOD AND SYSTEM FOR EXTRACTING CHARACTERISTIC STRING, METHOD AND SYSTEM FOR SEARCHING FOR RELEVANT DOCUMENT USING THE SAME, STORAGE MEDIUM FOR STORING CHARACTERISTIC STRING EXTRACTION PROGRAM, AND STORAGE MEDIUM FOR STORING RELEVANT DOCUMENT SEARCHING PROGRAM

BACKGROUND OF THE INVENTION

The present invention relates to a method and system for extracting a character string indicative of a feature of contents described in a document, a method and system for searching a document database for a document or documents having contents similar to those described in a document specified by a user with use of the first-mentioned method and system, and a storage medium for storing a searching program therein.

As use of personal computers and Internet spreads, electronic documents have been explosively increased in these years. And its acceleratingly increasing spread is estimated in future. In such circumstances, such a strong demand has been enhanced that a user wants to search quickly and efficiently for a document or documents containing information desired by the user.

One of techniques for satisfying such a demand is a full-text search. In the full-text search, documents to be searched are registered as a text in a computer system for creation of a database, and the system searches the database for a document or documents containing a search character string (which will be referred as a query term, hereinafter) specified by a user. In this way, the full-text search is featured in that, since the searching is carried out for the character string itself in the documents, any word can be searched unlike a prior art keyword searching system based on a previously-set keyword.

However, in order to reliably search for a document or documents containing information desired by the user, it is necessary for the user to make a complex search conditional expression accurately indicative of user's search intention and to enter it into the system. This is a hard business for ordinary users who are not experts on information search.

For the purpose of eliminating such troublesomeness, much attention is now focused on a relevant document searching technique for showing as an example a document (which will be referred to as a 'seed' document, hereinafter) containing contents desired by a user per se to search for a document or documents similar to the seed document.

Disclosed as one of the relevant document searching methods is, for example, a technique (which will be referred to as the prior art 1, hereinafter) for extracting words contained in a seed document through morphological analysis to search for a relevant document or documents based on the extracted words, as in JP-A-8-335222.

In the prior art 1, words contained in a seed document are extracted through morphological analysis to search for a relevant document or documents containing the words. For example, when the seed document is a document 1 of " . . . . 携帯電話 の使用時 のマナーが 問題になる。User's manner when the portable phone is in use becomes important.) . . . ", words such as "携帯電話 (portable phone)", "マナー(manner)" and "問題 (important)" are extracted to look up a word dictionary through morphological analysis. As a result, the system can search for a document 2 of " . . . . 電車内での携帯電話の使用 は禁止 されている。 (Use of portable phones in trains is banned) . . . " containing "携帯電話" as a relevant document.

However, the prior art 1, which uses the word dictionary for word extraction, has two problems which will be mentioned below.

First one of the problems is that, when a word not listed in the word dictionary indicates seed-document's essential contents (which will be referred to as central concept, hereinafter), there is impossibility of accurately searching for the document's central concept even when similar searching is carried out with use of the other words, because the essential word cannot be extracted as a search word from the seed document. In other words, when information desired by the user is a new word, the new word not listed in the word dictionary results undesirably in search of a document or documents having concepts shifted from the target central concept.

The second problem is that, even when the word desired by the user is listed in the word dictionary, a document or documents having concepts shifted from the central concept may be undesirably searched depending on how to extract the word. For example, words such as "携帯電話", "マナー", and "問題" are extracted from the above document 1 of " . . . . 携帯電話 の使用時 のマナーが 問題になる。. . . ". However, there is undesirably a likelihood that a document 3 of " . . . . 電話での話し方について注意された。 (I got an advice about how to talk on phone) . . . " is calculated low in its similarity because the word "電話" cannot be extracted.

This results from the fact that search words are all extracted from the word dictionary.

The problems in the prior art 1 have been explained above.

For the purpose of solving the above problems, there has been suggested a technique (which will be referred to as the prior art 2, hereinafter) in Japanese Patent Application No. 9-309078, by which character strings each having n continual characters of a type (which strings will be referred to as the n-grams, hereinafter) such as 'Kanji' or 'Katakana' are mechanically extracted according to the character types to search for a relevant document or documents, without using any word dictionary.

In the prior art 2, how to extract the n-gram is changed according to the character types to extract meaningful n-grams (which will be referred to as characteristic strings, hereinafter). For example, 2-grams are mechanically extracted from a character string of Kanji characters (which string will be referred to as a Kanji character string, hereinafter); while a character string of Katakana characters having the longest length (which string will be referred to as a Katakana longest character string, hereinafter), that is, a Katakana longest character string itself is extracted from character strings of katakana characters (which strings will be referred to as Katakana character strings, hereinafter). In this case, characteristic strings such as "携帯", "帯電", "電話", "使用", "マナー", and "問題" are extracted from the above document 1 of " . . . . 携帯電話 の使用時 のマナーが 問題になる。. . . " as a seed document. That is, since the character string "電話" is also extracted without missing, even the document 3 of " . . . . 電話での話し方について注意された。. . . " can be extracted with a correctly calculated similarity.

In the prior art 2, however, there is a possibility of extracting even an n-gram across the words of a Kanji character string available to make a compound word from the Kanji character string. For this reason, use of this search method causes calculation of a similarity of such a document that is not similar to the seed document in contents, which results in a problem that such a document as not to be associated with the seed document is undesirably searched. For example, for the characteristic string of "带電" extracted from the document 1 of " . . . . 携帯電話の使用"使用""マナー" . . . " as a seed document, its similarity is calculated, which undesirably results in erroneous search of a document 4 of " . . . . 電荷の帯電を防ぐために、接地 しなくてはならない。 (In order to prevent charging, it must be grounded.) . . . " as a relevant document.

For solving the above problem, there has been suggested a technique (which will be referred to as the prior art 3, hereinafter) for extracting a characteristic string using statistical information of 1-gram, as shown in a Journal of the Information Processing Society of Japan, pp. 2286 to 2297, Vol. 38, No. 11, November 1997.

In the prior art 3, with respect to each of 1-grams appearing in a document to be registered, a probability of 1-gram forming a head of a word (which probability will be referred to as a head-position probability, hereinafter) as well as a probability of 1-gram forming a tail of a word (which probability will be referred to as a tail-position probability, hereinafter) are previously calculated at the time of registering the document. In this case, it is assumed that a word consists of a string of an single type of characters such as Kanji or Katakana (which string will be referred to as a single character type string, hereinafter) and is delimited at a character type boundary such as the boundary between Kanji and Katakana, and that the 1-gram located directly after the character type boundary is regarded as a head 1-gram in a word and the 1-gram located directly before the character type boundary is regarded as a tail 1-gram in a word.

For example, with regard to the Kanji character string "使用" delimited at a character type boundary and extracted from the above document 1 of " . . . . "携帯"の使用"使用""マナー" . . . ", "使" is a head 1-gram in the word and "用" is a tail 1-gram in the word.

For searching for a relevant document or documents, a single character type string is first extracted from a specified seed document. Next a probability of division of the single character type string between continual two of 1-grams in the single character type string (which probability will be referred to as a division probability, hereinafter) is calculated on the basis of a tail-position probability of front one of the continual two 1-grams in the single character type string and a head-position probability of rear one thereof. When the value of a calculated division probability exceeds a predetermined value (which will be referred to as a division threshold, hereinafter), the system performs division of the single character type string thereat.

Explanation will be made as to detailed processing operations of the prior art 3 with a division threshold of 0.050.

First of all, with respect to each of 1-grams appearing in all documents to be registered, the system counts an occurrence frequency, the number of times of occurrence at the heads of words (which will be referred to as the head-position frequency, hereinafter) and the number of times of occurrence at the tails of words (which will be referred to as the tail-position frequency, hereinafter) at the time of registering the documents and then stores the counted values in an occurrence information file. In the case of the above document 1, occurrence information is obtained of an occurrence frequency of "携" is 1, a head-position frequency is 1 and tail-position frequency is 0. FIG. 2 shows an exemplary occurrence information file.

Thereafter, looking up the above occurrence information file, the system calculates head and tail probabilities of each 1-gram and stores them in an occurrence probability file. For example, a head-position probability of 1-gram "携" is 768/4,740=0.16 and a tail-position probability of 1-gram "携" is 492/4,740=0.10. FIG. 3 shows an exemplary occurrence probability file.

Explanation will next be made as to how to search for a document or documents in the prior art 3 by referring to a single character type string of "携帯電話" as an example.

First 3 sets of 2 pairs of 1-grams of "携", "帯", "帯", "電", and "電", "話" are extracted from the single character type string of "携帯電話". In each 1-gram pair, the system acquires a tail-position probability of front one of 1-grams and a head-position probability of rear one of 1-grams from the occurrence probability file previously created at the time of the document registration, and calculates a division probability based on the acquired head and tail probabilities.

FIG. 4 shows how to calculate division probabilities for the 3 1-grams extracted from "携帯電話". In this example, the division probabilities of ("携", "帯"), ("帯", "電") and ("電", "話") are calculated as 0.011, 0.054 and 0.005 respectively. Since 0.054 in the division probability of ("携", "帯") in these division probabilities is larger than the division threshold of 0.050, division is carried out between "帯" and "電". On the other hand, the division probabilities of ("携", "帯") and ("電", "話") are 0.011 and 0.005 respectively. Since these are smaller than the division threshold of 0.050, no division is carried out between these 1-grams. As a result, "携帯電話" is divided at between "帯" and "電" into two characteristic strings of "携帯" and "電話".

The detailed processing method in the prior art 3 has been explained above. In this way, consideration is paid in the prior art 3 not to search for a document or documents not similar in contents to the seed document, by extracting characteristic strings using 1-gram statistical information so as not to extract an unsuitable characteristic string across words.

However, the prior art 3 has a problem that, since the system judges division or non-division on the basis of the absolute value of the division probability, an extraction accuracy of the characteristic string as a word is low. For example, with respect to a single character type string of "帯電", the system extracts a pair of 1-grams of ("帯", "電") and calculates 0.054 as a division probability between the 1-grams.

Since the calculated value is greater than the division threshold of 0.050, division is erroneously carried out, as between "帯" and "電" in "帯電" (which division will be referred to as the erroneous division, hereinafter), with the result that the system undesirably extracts unsuitable two characteristic strings. This leads to a problem that the system undesirably searches also for a document or documents related to "帯 ('o-bi' in Japanese pronunciation)" as a relevant document or documents.

As has been explained above, the word extracting method using the word dictionary as in the prior art 1 has a problem that, a word not listed in the word dictionary indicates the main concept of the seed document, the system unfavorably searches for a document or documents shifted from the main concept.

Further, the method for simply extracting n-gram from the single character type string according to the character type as in the prior art 2 has a problem that, since the system undesirably extracts n-gram across words from a Kanji character string available to make a compound word the system undesirably searches for a document or documents not associated with the seed document as a relevant document or documents.

Furthermore, the method for calculating the division probability using the 1-gram statistical information and judging division or non-division on the basis of the absolute value of the calculated division probability value as in the prior art 3 also has a problem, since the extraction accuracy of the characteristic string as a word is low, the system undesirably involves mixture of search noise, thus resulting in erroneous search of a document or documents shifted from the target main concept as a relevant document or documents.

SUMMARY OF THE INVENTION

In order to solve the above problems in the prior arts, it is therefore an object of the present invention to provide a method and system for extracting a characteristic string with less erroneous division.

Another object of the present invention is to provide a method and system for extracting a characteristic string with less erroneous division and thus with less search noise to realize searching of a relevant document or documents with less shift from the main concept of a seed document.

In order to solve the above problems, the characteristic string extracting method in accordance with the present invention extracts a characteristic string from a seed document through operations of steps which follow.

More specifically, The characteristic string extracting method of the present invention includes steps of registering a document and extracting a characteristic string from a seed document, wherein the document registration step further includes steps of:
reading a document to be registered for document registration (step 1);
dividing character strings in the registered document read in the document reading step by character type boundaries between Kanji and Katakana to extract single character type strings (step 2);
with respect to each of the single character type strings extracted in the above single character type string extracting step, judging a character type thereof and when determining as a Kanji or katakana type, with respect to a predetermined length of n-gram in the registered document, counts an occurrence frequency, a frequency of occurrence as a word head (which will be referred to as the head-position frequency, hereinafter), a frequency of occurrence as a word tail (which will be referred to as the tail-position frequency, hereinafter), and a frequency of occurrence of the n-gram itself as a word (which will be referred to as the independent frequency, hereinafter) (step 3);
adding n-gram occurrence information counted by the above occurrence information counting step to occurrence information of the n-gram of the document already registered in a database to calculate occurrence information on the entire database and storing the calculated information in an associated occurrence information file (step 4);
with respect to the n-gram which was counted in its occurrence information in the above occurrence information counting step, acquiring occurrence information of the entire database from the associated occurrence information file to calculate a probability thereof as a word head (which will be referred to as the head-position probability, hereinafter), a probability thereof as a word tail (which will be referred to as the tail-position probability, hereinafter), and a probability of occurrence as the n-gram itself (which will be referred to as the independent probability, hereinafter) and storing the calculated probabilities in the associated occurrence probability file (step 5);
extracting a predetermined length of n-gram from the single character type string extracted in the above single character type string extracting step to count an occurrence frequency in the registered document (step 6);
storing the occurrence frequency counted in the above occurrence frequency counting step in an associated occurrence frequency file (step 7); and
extracting a characteristic string from a seed document,
wherein the characteristic string extracting step further includes steps of:
reading the seed document (step 8);
dividing a character string in the seed document read in the above seed document reading step by character type boundaries to extract single character type strings (step 9); and
with respect to the single character type string extracted in the searching single character type string extracting step, judging a character type thereof (step 10),
wherein, when the character type is of Kanji or Katakana, the system reads the occurrence probability file to acquire an independent probability of a character string ranging from the head of the single character type string to an i-th character, an independent probability of a character string of the head to (i+1)th characters, a head-position probability of the (i+1)th character, and a head-position probability of an (i+2)th character; calculates a probability of division of the single character type string at the i-th character (which will be referred to as a division probability, hereinafter) as a product of the independent probability of the character string of the head to the i-th characters and the head-position probability of the (i+1)th character; calculates a division probability at the (i+1)th character as a product of the independent probability of the character string of the head to the (i+1)th characters and the head-position probability of the (i+2) th character; compares the division probability of the i-th character with a division probability of the (i+1)th character to set larger one of the division probabilities as a single character type string division point (which will be referred to as the division point, hereinafter); the character type is not of Kanji or katakana, extracts the single character type string per se as the characteristic string; and repeats similar operations over the remaining character strings other than the extracted characteristic string to extract another characteristic string.

In order to attain the above objects, further, a method for searching for a relevant document or documents in accordance with the present invention extracts a characteristic string through the above steps to search for a document or documents similar to a seed document using the extracted characteristic string.

More specifically, the relevant document searching method of the present invention includes steps of registering a document and searching for a document or documents similar to a seed document, wherein the document registration step further includes steps of:
reading a document to be registered for document registration (step 1);
dividing character strings in the registered document read in the document reading step by character type boundaries between Kanji and Katakana to extract single character type strings (step 2);
with respect to each of the single character type strings extracted in the above single character type string extracting step, judging a character type thereof and when determining as a Kanji or katakana type, with respect to a predetermined length of n-gram in the registered document, counting an occurrence frequency, a frequency of occurrence as a word head (which will be referred to as the head-position frequency, hereinafter), a frequency of occurrence as a word tail (which will be referred to as the tail-position frequency, hereinafter), and a frequency of occurrence of the n-gram itself as a word (which will be referred to as the independent frequency, hereinafter) (step 3);
adding n-gram occurrence information counted by the above occurrence information counting step to occurrence information of the n-gram of the document already registered in a database to calculate occurrence information on the entire database and storing the calculated information in an associated occurrence information file (step 4);
with respect to the n-gram which was counted in its occurrence information in the above occurrence information contain step, acquiring occurrence information of the entire database from the associated occurrence information file to calculate a probability thereof as a word head (which will be referred to as the head-position probability, hereinafter), a probability thereof as a word tail (which will be referred to as the tail-position probability, hereinafter), and a probability of occurrence as the n-gram itself (which will be referred to as the independent probability, hereinafter) and storing the calculated probabilities in the associated occurrence probability file (step 5);
extracting a predetermined length of n-gram from the single character type string extracted in the above single character type string extracting step to count an occurrence frequency in the registered document (step 6);
storing the occurrence frequency counted in the above occurrence frequency counting step in an associated occurrence frequency file (step 7); and
extracting a characteristic string from a seed document, wherein the relevant document searching step further includes steps of:
reading the seed document (step 8);
dividing a character string in the seed document read in the above seed document reading step by character type boundaries to extract single character type strings (step 9);
with respect to the single character type string extracted in the searching single character type string extracting step, judging a character type thereof (step 10),
wherein, when the character type is of Kanji or Katakana, the system reads the occurrence probability file to acquire an independent probability of a character string ranging from the head of the single character type string to an i-th character, an independent probability of a character string of the head to (i+1)th characters, a head-position probability of the (i+1)th character, and a head-position probability of an (i+2)th character; calculates a probability of division of the single character type string at the i-th character (which will be referred to as a division probability, hereinafter) as a product of the independent probability of the character string of the head to the i-th characters and the head-position probability of the (i+1) th character; compares the division probability of the i-th character with a division probability of the (i+1)th character to set larger one of the division probabilities as a single character type string division point (which will be referred to as the division point, hereinafter); the character type is not of Kanji or katakana, extracts the single character type string per se as the characteristic string; and repeats similar operations over the remaining character strings other than the extracted characteristic string to extract another characteristic string,
counting occurrence frequencies of all characteristic strings extracted in the above characteristic string extracting step (step 11);
reading the occurrence frequency file for all the characteristic strings extracted in the characteristic string extracting step to acquire occurrence frequencies of the characteristic strings in each document in the database (step 12);
with respect to the characteristic strings extracted in the above characteristic string extracting step, calculating their occurrence frequencies in the seed document counted in the above within-seed-document occurrence frequency counting step as well as similarities between the seed document and the documents in the database on the basis of a predetermined computation expression with use of the occurrence frequencies of the documents within the database acquired in the above within-database occurrence frequency acquiring step (step 13); and
outputting a searched result on the basis of the similarities calculated in the above similarity calculating step (step 14).

The principle of the present invention based on the above document searching method will now be explained.

In the present invention, the steps 1 to 7 are carried out for document registration.

First of all, in the document reading step 1, the system reads a document to be registered. In the next single character type string extracting step 2, the system divides character strings in the registration document read in the above document reading step 1 by character type boundaries of Kanji or Katakana to extract character strings of a single character type. For example, single character type strings of "電車内", "での", "携帯電話", "の", "使用", "は", "禁止", and "されている" are extracted from the above document 2 of ". . . . 電車内での携帯電話の使用 は禁止 されている。 . . . ".

In the occurrence information counting step 3, next, the system judges the character type of each of the single character type strings extracted in the single character type string extracting step 2, and if the character type is of Kanji or Katakana, the system counts an occurrence frequency of a predetermined length n of n-gram in the registration document, a head-position frequency, a tail-position frequency and an independent frequency thereof. For example, assume that the system counts occurrence frequencies, head frequencies and tail frequencies of 1-gram and 2-gram from Kanji and Katakana character strings. Then with respect to the single character type strings extracted in the single character type string extracting step 2, the system counts 1 for the occurrence frequency of "携", 1 for its head-position frequency, 0 for its tail-position frequency and 0 for its independent frequency, and counts 1 for the occurrence frequency of "携帯", 1 for its head-position frequency, 0 for its tail-position frequency and 0 for its independent frequency.

In the next occurrence information file creating/registering step 4, the system adds occurrence information of the n-gram already extracted in the occurrence information counting step 3 to occurrence information on the document already registered in the database and stores occurrence information as accumulated information in the associated occurrence information file. FIG. 5 shows an exemplary occurrence information file. The illustrated occurrence information file is an example in which the occurrence information extracted in the above occurrence information counting step 3 is stored. The illustrated occurrence information file shows information on an occurrence frequency of 4,740, an head-position frequency of 768, an tail-position frequency of 492 and an independent frequency of 42 for the 1-gram "携"; and also information on an occurrence frequency of 462, a head-position frequency of 419, a tail-position frequency of 52 and an independent frequency of 48 for the 2-gram "携帯".

In the occurrence probability file creating/registering step 5, the system calculates occurrence probabilities of n-grams whose occurrence information are stored in the occurrence information file creating/registering step 4, and stores the probabilities in the associated occurrence probability file. With respect to the 1-gram "携", for example, as shown in FIG. 5, the system counts 4,740 of its occurrence frequency, 768 for its head-position frequency, 492 for its tail-position frequency and 42 for its independent frequency, and thus calculates 0.16 (=768/4,740) for its head-position probability, 0.10 (=492/4,740) for its tail-position probability and 0.01 (=42/4,740) for its independent probability. FIG. 6 shows an exemplary occurrence probability file. The illustrated occurrence probability file shows an example when the occurrence probabilities extracted in the above occurrence information counting step 3 are stored. That is, the example shows information on a head-position probability of 0.16, a tail-position probability of 0.10 and an independent probability of 0.01 for the 1-gram "帯", and also information on an head-position probability of 0.90, an tail-position probability of 0.11 and an independent probability of 0.10 for the 2-gram "携帯".

In the next occurrence frequency counting step 6, the system extracts a predetermined length of n-grams from all single character type strings extracted in the single character type string extracting step 2 and counts occurrence frequencies thereof in the registration document. And in the occurrence frequency file creating/registering step 7, the system stores the occurrence frequencies of the n-grams extracted in the above occurrence frequency counting step 6 in the corresponding occurrence frequency file.

FIG. 24 shows a procedure of operations of creating an occurrence frequency file with use of the aforementioned document 2 of ". . . . 電車内での携帯電 話の使用 は禁止 されている。 . . . " as an example.

First, in the single character type string extracting step 2, the system extracts all single character type strings from the document 2 as a registration document.

In the next occurrence frequency counting step 6, the system extracts a predetermined length of n-gram from all the single character type strings extracted in the above single character type string extracting step 2, and counts occurrence frequencies thereof in the registration document. In the illustrated example, it is assumed that the system extracts n-grams having lengths of 3 or less from the single character type strings. In this case, the system extracts "電", "車" and "内" having a length of 1; "電車" and "車内" having a length of 2; and "電車内" having a length of 3 from "電車内" included in single character type strings 2404; and counts occurrence frequencies thereof in the document 2. As a result, the system counts 2 for the occurrence frequency of "電" in the document 2 and 1 for the occurrence frequency of "車" in the document 2.

In the occurrence frequency file creating/registering step 7, the system stores the occurrence frequencies of the n-grams extracted in the occurrence frequency counting step 6 in the corresponding occurrence frequency file. As a result, the system stores in the occurrence frequency file the occurrence frequencies of the n-grams from the document 2 in combination with an identification number of the registration document, in the form of (2,2) for 1-gram "電", (2,1) for 1-gram "車", (2,1) for 1-gram "内", (2,1) for 2-gram "電車", (2,1) for 2-gram "車内" and (2,1) for 3-gram "電車内". In this case, "電車" (2,1) means that 2-gram "電車" appears once in the document having an identification number 2.

For searching operations, the system executes the steps 8 to 14.

First, in the seed document reading step 8, the system reads the document 1 as a seed document. In the next searching single character type string extracting step 9, the system divides a character string in the seed document (document 1) read in the seed document reading step 8 by character type boundaries to extract single character type strings of single character types.

In the characteristic string extracting step 10, the system judges the character type of each of the single character type strings extracted in the searching single character type string extracting step 9.

If the character type is of Kanji or Katakana, the system reads the aforementioned occurrence probability file and acquires an independent probability of a character string of from a head to i-th characters in the single character type string, an independent probability of from the head to (i+1)th character, a head-position probability of the (i+1)th character and a head-position probability of the (i+2)th character.

And the system calculates a division probability at the i-th character as a product of the independent probability of the character string of the head to i-th characters and the head-position probability of the (i+1) th character; and calculates a division probability at the (i+1)th character as a product of the independent probability of the character string of the head to (i+1)th characters and the head-position probability of the (i+2)th character. And the system compares the division probabilities of the i-th and (i+1)th characters, selects larger one of the probabilities as a division point, and extracts a character string of from the head to the division point characters as a characteristic string.

If the character type is not of Kanji or Katakana, then the system uses the single character type string itself as a characteristic string and repeats operations similar to the above to extract another characteristic string.

FIG. 8 shows an example of how to extract characteristic strings from the single character type string "携帯電話" extracted from the document 1. The system first calculates a division probability at the first character in "携帯電話" as a product of an independent probability of 0.01 for "携" and a head-position probability of 0.11 for "帯", that is, 0.001 (=0.01×0.11). Similarly, the system calculates a division probability at the second character as a product of an independent probability of 0.10 for "携帯" and a head-position probability of 0.36 for "電", that is, 0.036 (=0.10× 0.36). The system then compares these division probabilities and divides the single character type string by the character having the larger probability. In this case, since the division probability 0.036 of the second character is larger than the other, the single character type string 話し方に is divided into "携帯" and "電話".

Also shown in FIG. 9 is an example of the single character type string "帯電" which cannot be divided suitably in the prior art 3, which will be explained in connection with dividing operations of the present invention. First, the system of the present invention calculates 0.0001 (=0.015× 0.01) for a division probability of the first character in "帯電" as a product of an independent probability (0.01) of "帯" and an independent probability (0.01) of "電". The system also calculates a division probability at the second character, that is, an occurrence probability of "帯電" as a single character type string itself, as 0.10 for the independent probability of "帯電". The system compares these probabilities and divides the single character type string by the character having larger one of the probabilities into single character type strings. In this case, however, since the independent probability 0.10 of "帯電" is larger, "帯電" is divided at the second character, which means that the single character type string "帯電" is eventually not divided and extracted as a group.

In this way, since comparison of the division probabilities for the division of the single character type string enables word division accurately reflecting reflecting actual occurrence circumstances in the database, the present invention can reduce unsuitable division more remarkably than the aforementioned prior art 3 for performing the division based on the absolute values of the division probabilities.

In the within-seed-document occurrence frequency counting step 11, next, the system counts occurrence frequencies of the characteristic strings in the seed document, extracted in the above characteristic string extracting step 10.

In the within-database occurrence frequency acquiring step 12, with respect to the characteristic strings extracted in the characteristic string extracting step 10, the system looks up the above occurrence frequency file and acquires occurrence frequencies in the documents within the database.

In the similarity calculating step 13, with regard to the characteristic strings extracted in the characteristic string extracting step 10, the system calculates occurrence frequencies of the featured strings counted in the within-seed-document occurrence counting step 11 and in the within-database occurrence frequency acquiring step 12 as well as similarities thereof on the basis of the occurrence frequencies in the documents of the database.

For the calculation of the similarities, for example, such a similarity computation expression (1) as disclosed in JP-A-6-110948 and given below may be employed.

A similarity S(i) to document i is expressed as follows.

$$S(i) = \frac{\sum_{j=1}^{n}(U(j) \times R(j))}{\sqrt{\sum_{j=1}^{n}U(j)^2 \times \sum_{j=1}^{n}R(j)^2}} \quad (1)$$

Where U(j) indicates a normalized weight for the j-th n-gram in the seed document and is calculated from occurrence frequencies of the n-grams in the seed document. R(j) indicates a normalized weight of the j-th n-gram in a document in the database and is calculated from occurrence frequencies of the n-grams of the documents in the database. The 'normalized weight' is an n-gram occurrence bias in the database. This means that the larger the value of the normalized weight is the n-gram appears as more biased to a specific document. How to calculate the normalized weight is explained in JP-A-6-110948 and thus explanation thereof is omitted herein. n indicates the number of all the documents in the database.

When the similarity S(i) for the document i is calculated using the similarity expression (1) when the document 1 is specified as the seed document, it results in:

S(1)=1.0
S(2)=0.262
S(3)=0.048
S(4)=0.0

As a result, the documents are arranged in an descending order of the similarities in the search result output step 14, documents 1, 2 and 3 are listed in this order. In this connection, the document 4 cannot be output as a search result because it has a similarity of 0.

As has been explained above, the similarity document searching method of the present invention based on the characteristic string extracting method can mechanically extract character strings from the single character type string without using any word dictionary as in the prior art 1. Therefore the present invention can perform searching operation without missing of any word and thus can accurately search for the concept of the seed document.

Further, unlike the prior art 2 for simply extracting n-grams from a single character type string according to the character types, the present invention extracts a group of meaningful n-grams on the basis of statistical information and can realize accurater searching of the concept of the seed document.

Further, unlike the prior art 3 for performing the division based on the absolute values of the division probabilities, the present invention compares the division probabilities and performs the division based on the larger probability.

Accordingly the present invention can realize word division accurately reflecting actual occurrence circumstances in the database and can remarkably reduce the possibility of unsuitable word division. In this way, since the present invention can avoid searching of unsuitable characteristic strings when compared with the prior art 3, the invention can suitably search for the concept of the seed document and can search for a relevant document or documents at a high speed.

BRIEF DESCRIPTION OF THE DRAWINGS

FIG. 2 shows an exemplary occurrence information file in a prior art 3;

FIG. 3 shows an exemplary occurrence probability file in the prior art 3;

FIG. 6 shows an exemplary occurrence probability file in accordance with the present invention;

FIG. 28 shows an example of how to calculate division probabilities in the first embodiment of the present invention;

FIG. 33 shows an example of executing the characteristic string extraction program 141a in the fourth embodiment of the present invention.

DETAILED DESCRIPTION OF THE EMBODIMENTS

Figure 1:
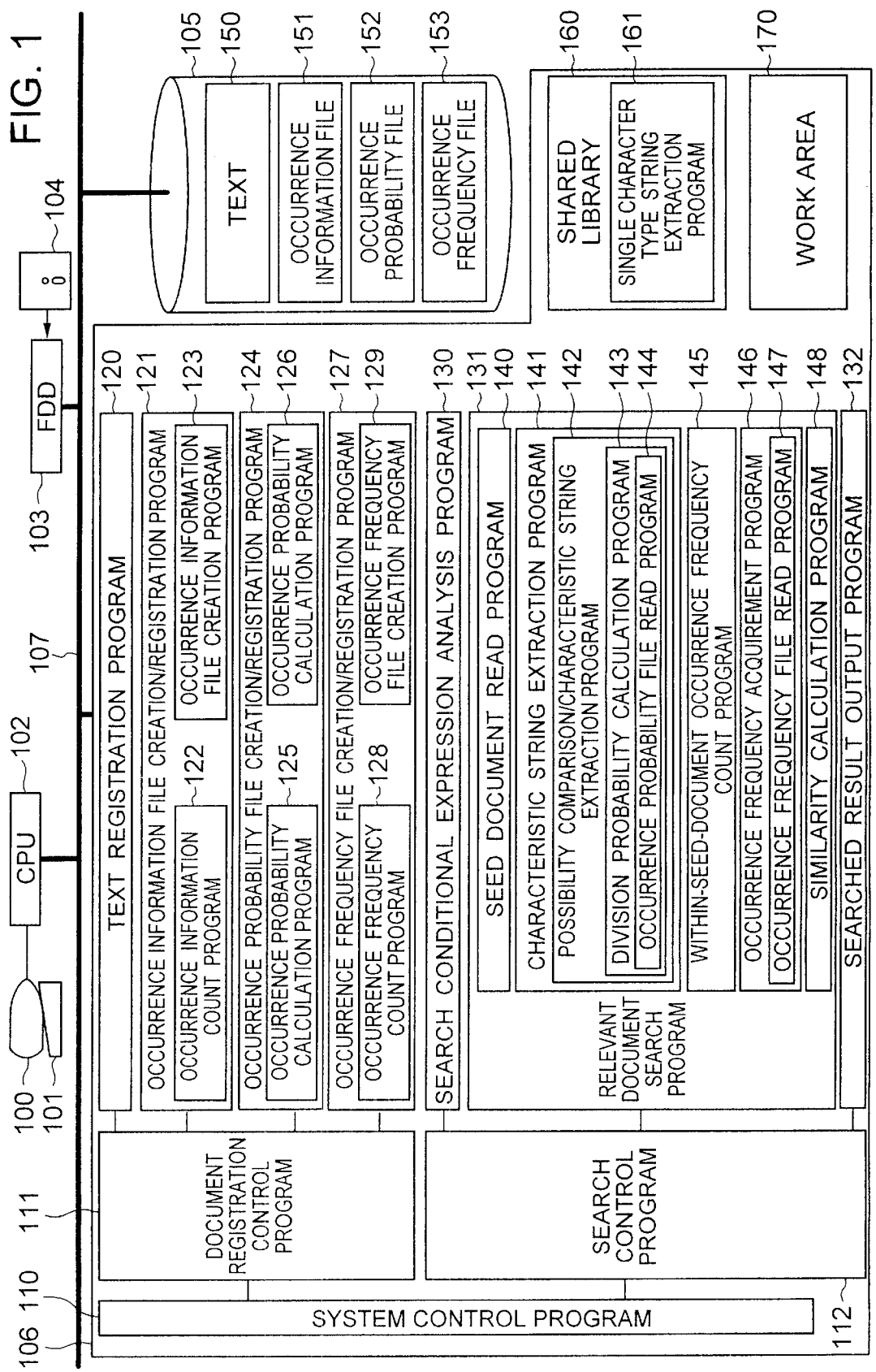
FIG. 1 shows an entire arrangement of a relevant document searching system in accordance with a first embodiment according to the present invention.

A first embodiment of the present invention will be detailed with reference to FIG. 1.

The first embodiment in which the present invention is applied to a relevant document searching system includes a display 100, a keyboard 101, a central processing unit (CPU) 102, a magnetic disk unit 105, a floppy disk drive (FDD) 103, a main memory 106 and a bus 107 connected therebetween.

Stored in the magnetic disk unit 105 are a text 150, an occurrence information file 151, an occurrence probability file 152 and an occurrence frequency file 153. Information about registration documents and a seed document stored in a floppy disk 104 is read from the FDD 103 into a work area 170 reserved in the main memory 106 or into the magnetic disk unit 105.

Stored in the main memory 106 are a system control program 110, a document registration control program 111, a shared library 160, a text registration program 120, an occurrence information file creation/registration program 121, an occurrence probability file creation/registration program 124, an occurrence frequency file creation/registration program 127, a search control program 112, a search conditional expression analysis program 130, a relevant document search program 131 and a searched result output program 132. Also reserved in the main memory 106 is the work area 170.

These programs are stored in a portable storage medium such as the floppy disk 104 or a CD medium such as CD-ROM (not shown in FIG. 1). The programs are read out from such storage medium and installed into the magnetic disk unit 105. At the time of starting the relevant document searching system, the system control program 110 causes these programs to be read out from the magnetic disk unit 105 and stored into the main memory 106.

The shared library 160 is made up of a single character type string extraction program 161.

The occurrence information file creation/registration program 121, which includes an occurrence information count program 122 and an occurrence information file creation program 123, is arranged to call the single character type string extraction program 161 from the shared library 160, which will be explained later.

The occurrence probability file creation/registration program 124 includes an occurrence probability calculation program 125 and an occurrence probability file creation program 126.

The occurrence frequency file creation/registration program 127 includes an occurrence frequency count program 128 and an occurrence frequency file creation program 129.

The relevant document search program 131, which includes a seed document read program 140, a characteristic string extraction program 141, a within-seed-document occurrence frequency count program 145, an occurrence frequency acquirement program 146 and a similarity calculation program 148, is configured to call the single character type string extraction program 161 from the shared library 160, which will be explained later.

The characteristic string extraction program 141 is used to call a program 142 for comparison of division probabilities and for extraction of a characteristic string (which will be referred to as the possibility comparison/characteristic string extraction program 142, hereinafter). The possibility comparison/characteristic string extraction program 142 is arranged to call a division probability calculation program 143. The division probability calculation program 143 is arranged to call an occurrence probability file read program 144.

The occurrence frequency acquirement program 146 is provided to call an occurrence frequency file read program 147.

The document registration control program 111 and search control program 112 are activated, in response to user's instruction from the keyboard 101, under control of the system control program 110 to control the text registration program 120, occurrence information file creation/registration program 121, occurrence probability file creation/registration program 124 and occurrence frequency file creation/registration program 127 and to control the search conditional expression analysis program 130, relevant document search program 131 and searched result output program 132, respectively.

Explanation will be made as to a procedure of operations of the relevant document searching system of the present embodiment.

The processing procedure of the system control program 110 will first be explained by referring to a problem analysis diagram (PAD) of FIG. 10.

The system control program 110 first analyzes a command input from the keyboard 101 in a step 1000.

When determining in a next step 1001 that the input command is one for registration execution based on its analyzed result, the program 110 starts the document registration control program 111 in a step 1002 to register a document.

When determining in a step 1003 that the input command is one for search execution, the program 110 starts in a step 1004 the search control program 112 to search a relevant document or documents.

The processing procedure of the system control program 110 has been explained above.

Explanation will next be made as to a processing procedure of the document registration control program 111 to be activated by the system control program 110 in the step 1002 of FIG. 10, with reference to a PAD of FIG. 11.

The document registration control program 111 first activates the text registration program 120 in a step 1100 to read text data of a document to be registered from the floppy disk 104 loaded in the FDD 103 into the work area 170 and then to load the data into the magnetic disk unit 105 as the text 150. The text data may be input to the system not only by using the floppy disk 104 but also by using other means such as a communication line (not shown in FIG. 1) or a CD-ROM drive (not shown in FIG. 1).

In a next step 1101, the document registration control program 111 starts the occurrence information file creation/registration program 121 to read out the text 150 stored on the work area 170, to create the occurrence information file 151 for n-grams therein and to store it into the magnetic disk unit 105.

In a next step 1102, the document registration control program 111 starts the occurrence probability file creation/registration program 124 to calculate occurrence probabilities of the n-grams in the text 150 stored in the work area 170 and to store it into the magnetic disk unit 105 as the corresponding occurrence probability file 152.

In a next step 1103, the document registration control program 111 starts the occurrence frequency file creation/registration program 127 to read out the text 150 stored in the work area 170, to count occurrence frequencies of all the n-grams in each document and to store them into the magnetic disk unit 105 as the corresponding occurrence frequency file 153.

The processing procedure of the document registration control program 111 has been explained above.

Figure 11:
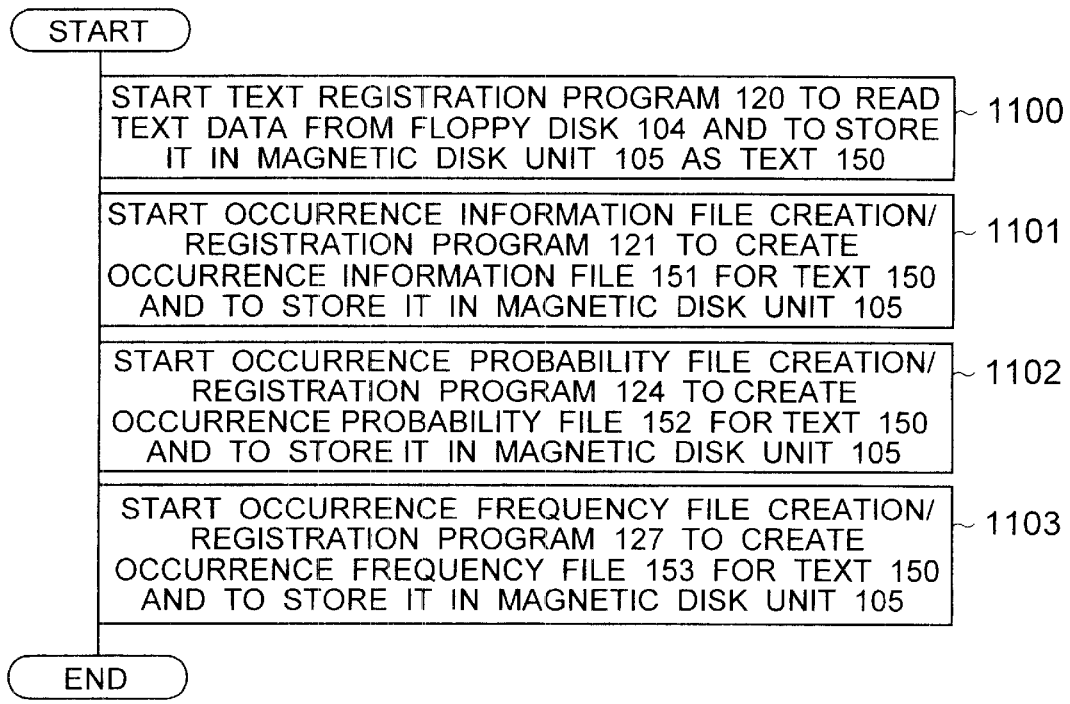
FIG. 11 is a PAD showing a procedure of processing operations of a document registration control program 111 in the first embodiment of the present invention.
Figure 12:
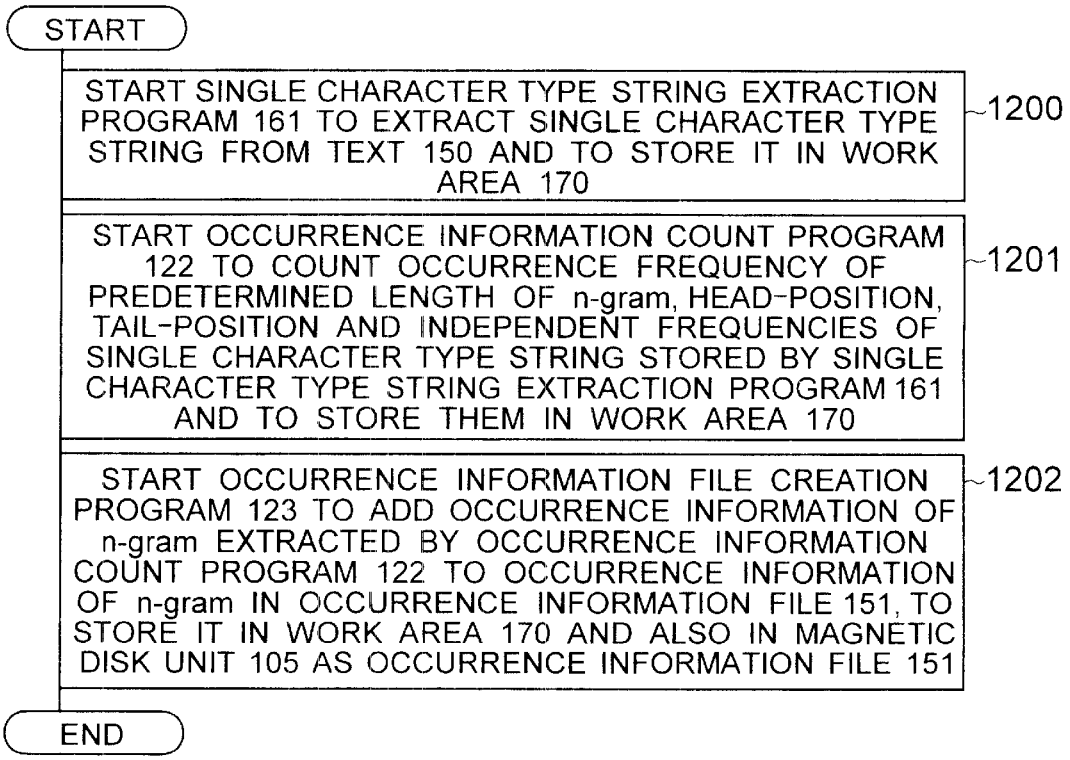
FIG. 12 is a PAD showing a procedure of processing operations of an occurrence information file creation/registration program 121 in the first embodiment of the present invention.

Explanation will then be made as to a processing procedure of the occurrence information file creation/registration program 121 to be activated by the document registration control program 111 in the step 1101 of FIG. 11, by referring to a PAD of FIG. 12.

The occurrence information file creation/registration program 121 first starts the single character type string extraction program 161 in a step 1200 and divides character strings in the text 150 at character type boundaries to extract single character type strings and to store them into the work area 170.

In a next step 1201, the program 121 starts the occurrence information count program 122 to count an occurrence frequency of a predetermined length of n-gram in the text 150, a head-position frequency of the single character type string stored in the work area 170, a tail-position frequency thereof and an independent frequency thereof, and to store them into the work area 170.

In a net step 1202, the program 121 starts the occurrence information file creation program 123 to add the occurrence frequency, head-position frequency, tail-position frequency and independent frequency of the n-gram in the text 150 stored in the work area 170 to the occurrence frequency, head-position frequency, tail-position frequency and independent frequency of the corresponding n-gram stored in the occurrence information file 151, to store it into the work area 170 and to store it into the magnetic disk unit 105 as the occurrence information file 151.

The processing procedure of the occurrence information file creation/registration program 121 has been explained above.

Figure 16:
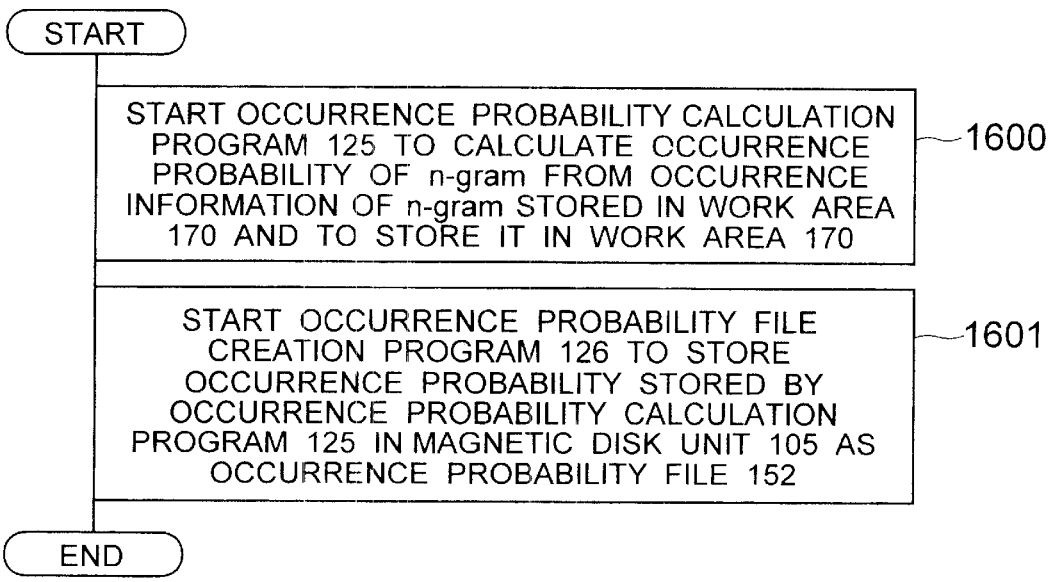
FIG. 16 is a PAD showing a procedure of processing operations of an occurrence probability file creation/registration program 124 in the first embodiment of the present invention.

Next explanation will be made with use of a PAD of FIG. 16 as to a processing procedure of the occurrence probability file creation/registration program 124 activated by the document registration control program 111 in the step 1102 of FIG. 11.

The occurrence probability file creation/registration program 124 first starts the occurrence probability calculation program 125 in a step 1600 to calculate an independent probability, head-position probability and tail-position probability of each n-gram from the occurrence information of each n-gram stored in the work area 170 and to store them into the work area 170.

In a next step 1601, the program 124 starts the occurrence probability file creation program 126 to store the independent probability, head-position probability and tail-position probability of each n-gram stored in the work area 170 into the magnetic disk unit 105 in the form of the occurrence probability file 152.

The processing procedure of the occurrence probability file creation/registration program 124 has been explained above.

Figure 25:
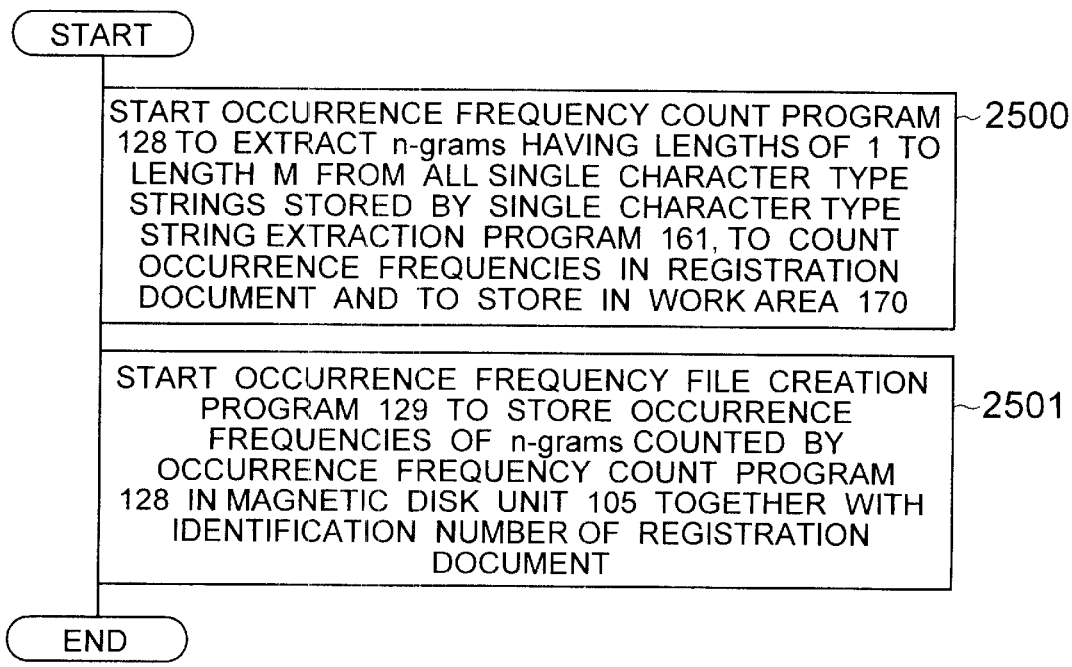
FIG. 25 is a PAD showing a procedure of processing operations of an occurrence frequency file creation/registration program 127 in the first embodiment of the present invention.

Explanation will next be made as to a processing procedure of the occurrence frequency file creation/registration program 127 to be activated by the document registration control program 111 in the step 1103 of FIG. 11, with reference to a PAD of FIG. 25.

The occurrence frequency file creation/registration program 127 first starts the occurrence frequency count program 128 in a step 2500 to extract n-grams having lengths ranging from 1 to m (a length of single character type string itself) from all the single character type strings stored in the work area 170 in the step 1200 of FIG. 12, to count occurrence frequencies of the n-grams in the registration document and to store them into the work area 170.

In a next step 2501, the program 127 starts the occurrence frequency file creation program 129 to store the occurrence frequencies of the n-grams counted in the step 2500 together with an identification number (also referred to as a document number, hereinafter) of the registration document into the magnetic disk unit 105 as the occurrence frequency file 153.

Figure 10:
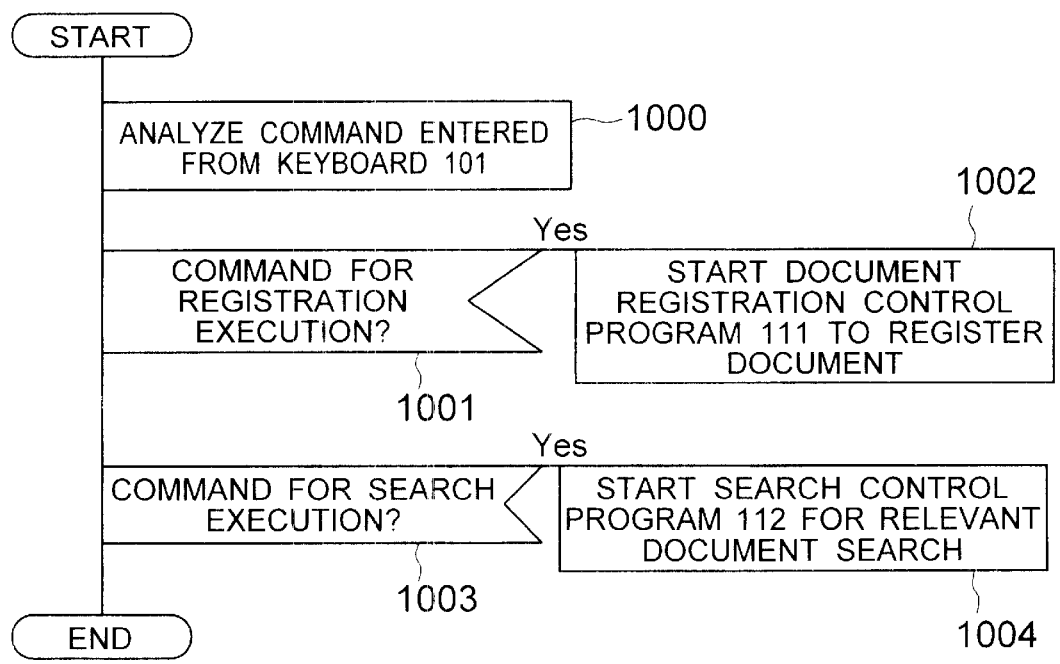
FIG. 10 is a problem analysis diagram (PAD) showing a procedure of processing operations of a system control program 110 in the first embodiment of the present invention.
Figure 13:
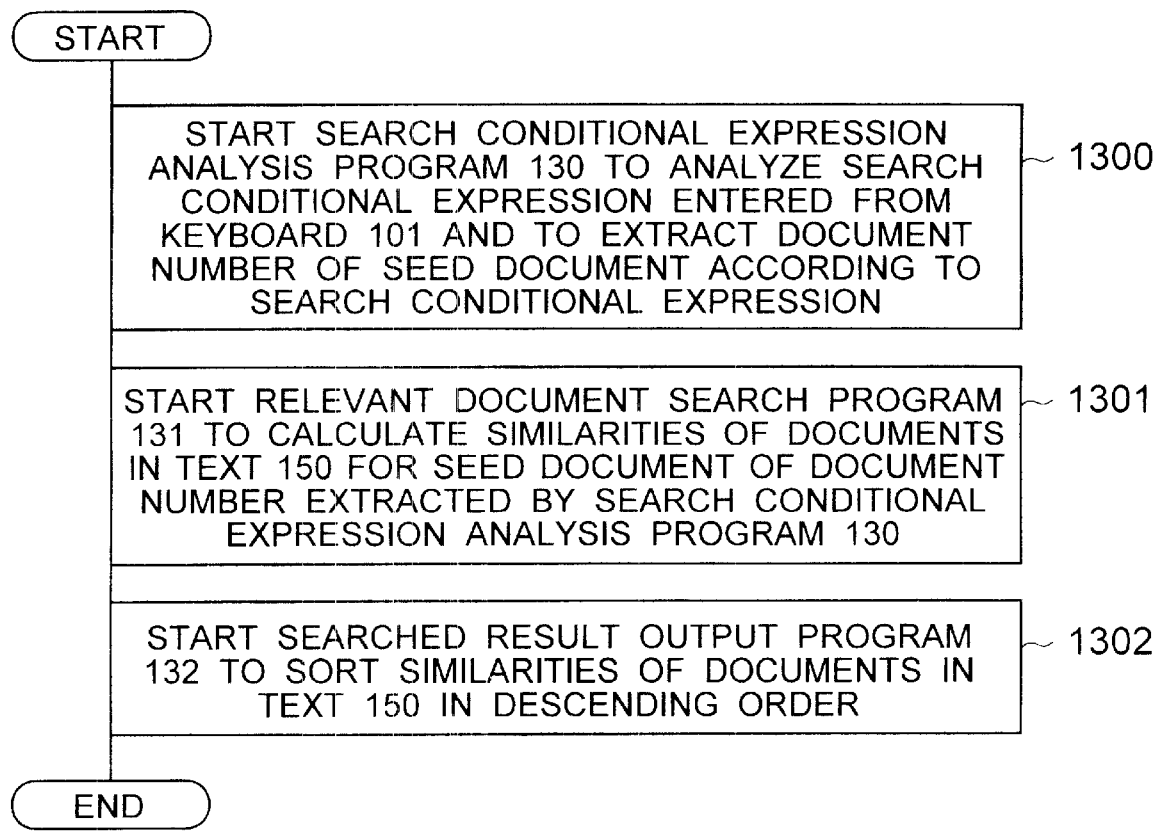
FIG. 13 is a PAD showing a procedure of processing operations of a search control program 112 in the first embodiment of the present invention.

A processing procedure of relevant document search based on the search control program 112 to be activated by the system control program 110 in the step 1004 of FIG. 10 will then be explained by referring to a PAD of FIG. 13.

The search control program 112 first starts the search conditional expression analysis program 130 in a step 1300 to analyze a search conditional expression entered from the keyboard 101 and to extract the document number of a specified seed document as a parameter in the search conditional expression.

In a next step 1301, the program 112 starts the relevant document search program 131 to calculate a similarity for each of the documents in the text 150 stored in the magnetic disk unit 105 with respect to the seed document having the document number extracted by the search conditional expression analysis program 130.

In a final step 1302, the program 112 starts the searched result output program 132 to output a searched result on the basis of the similarities of the documents calculated by the relevant document search program 131.

The processing procedure of the document search based on the search control program 112 has been explained above.

Explanation will next be made as to a processing procedure of the relevant document search program 131 to be activated by the search control program 112 in the step 1301 of FIG. 13, with reference to a PAD of FIG. 14.

The relevant document search program 131 first starts the seed document read program 140 in a step 1400 to read the seed document of the document number extracted from the search conditional expression by the search conditional expression analysis program 130 from the text 150 in the magnetic disk unit 105 to the work area 170.

In this case, the reading of the seed document may be realized not only by reading the document stored in the text 150 into the work area 170 but also by directly inputting the seed document from the keyboard 101 or by inputting it from other means such as the floppy disk 104, a CD-ROM drive (not shown in FIG. 1) or a communication line. Or the document reading may be realized by inputting the seed document from a searched result of a full-text search system or the like or by selecting the seed document from the output of the searched result output program 132.

In a next step 1401, the relevant document search program 131 starts the single character type string extraction program 161 of the shared library 160 to divide the text of the seed document read by the seed document read program 140 at character type boundaries into single character type strings and to store the character strings in the work area 170.

In a step 1402, the program 131 starts the characteristic string extraction program 141 (which will be explained later) to extract a characteristic string from the single character type strings acquired by the above single character type string extraction program 161.

In a next step 1403, the program 131 starts the within-seed-document occurrence frequency count program 145 to count an occurrence frequency of the characteristic string acquired by the characteristic string extraction program 141 in the seed document.

In a next step 1404, the program 131 starts the occurrence frequency acquirement program 146 to acquire occurrence frequencies of the characteristic string acquired by the above characteristic string extraction program 141 in the text 150 of the documents.

In a final step 1405, the program 131 starts the similarity calculation program 148 to calculate similarities between the seed document and the documents in the text 150 on the basis of the within-seed-document occurrence frequencies acquired by the above within-seed-document occurrence frequency count program 145 and the occurrence frequencies of the documents in the text 150 acquired by the above occurrence frequency acquirement program 146, with respect to the characteristic strings acquired by the above characteristic string extraction program 141.

For the similarity calculation, although the aforementioned similarity calculation expression (1) has been used in the present embodiment, other means may be employed. When the above expression (1) is used for the similarity calculation and the above document of " . . . . 携帯電話 の使用時 のマナーが 問題になる。 . . . " is specified as the seed document, a similarity S(i) for a document i is calculated as follows.

S(1)=1.0
S(2)=0.262
S(3)=0.048
S(4)=0.0

The processing procedure of the relevant document search program 131 has been explained above.

Explanation will be made as to a processing procedure of the characteristic string extraction program 141 activated by the relevant document search program 131 in the step 1402 of FIG. 14, with reference to a PAD of FIG. 17.

Figure 14:
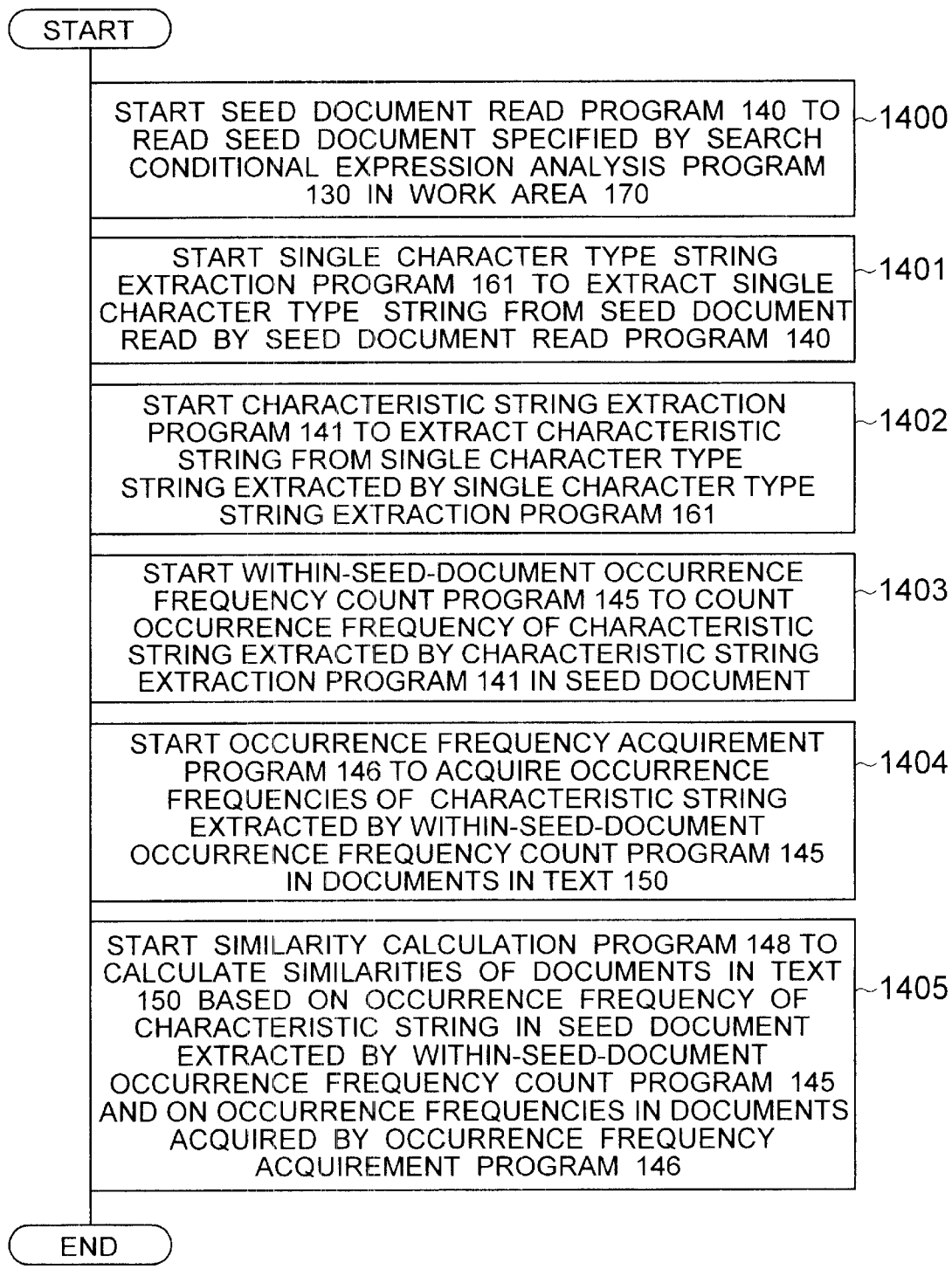
FIG. 14 is a PAD showing a procedure of processing operations of a relevant document search program 131 in the first embodiment of the present invention.

In a step 1700, the characteristic string extraction program 141 acquires all the single character type strings stored in the work area 170 by the single character type string extraction program 161 in the step 1401 of FIG. 14.

In a step 1701, the program 141 repetitively executes subsequent steps 1702 to 1704 with respect to all the single character type strings acquired in the step 1700.

More specifically, in the step 1702, the program 141 judges character types of the single character type strings acquired in the step 1700. When the character type is a Kanji or Katakana, the program 141 executes the step 1703; whereas, when the character type is not a Kanji nor katakana, the program 1401 executes the step 1704.

In the step 1703, the program 141 starts the possibility comparison/characteristic string extraction program 142 (which will be explained later) to extract characteristic strings from the character strings of a single kanji or Katakana character type.

In the step 1704, the program 141 extracts the single character type strings themselves other than the single Kanji or Katakana character type strings.

In a final step 1705, the program 141 stores the characteristic strings extracted in the steps 1702 and 1703 in the work area 170.

The processing procedure of the characteristic string extraction program 141 has been explained above.

A processing procedure of the characteristic string extraction program 141 shown in FIG. 14 will be explained in connection with a specific example.

Figure 27:
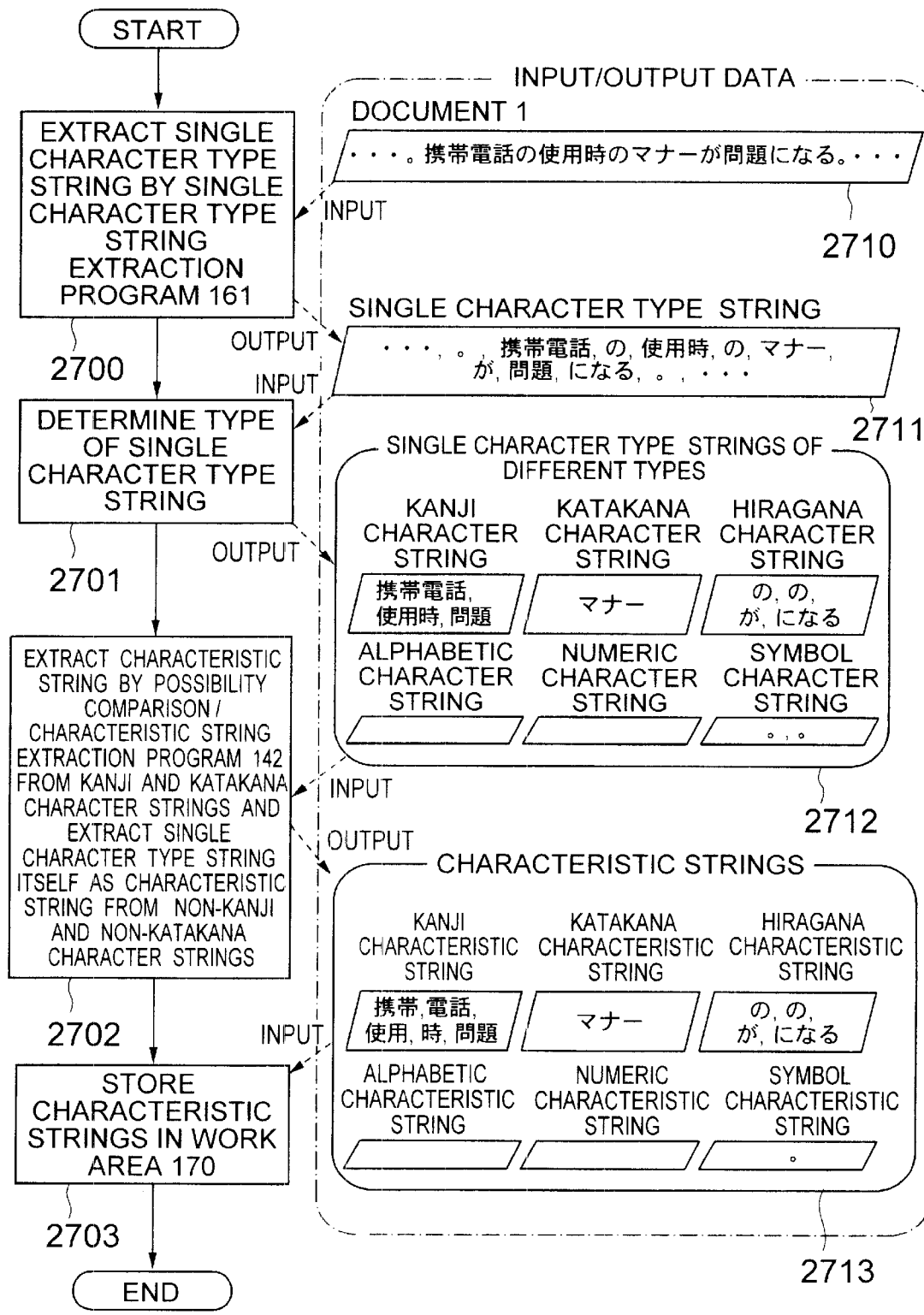
FIG. 27 shows an example of operations of executing the characteristic string extraction program 141 in the first embodiment of the present invention.

FIG. 27 shows an example of how to extract characteristic strings from the above document 1 of " . . . . 携帯電話 の使用時 のマナーが 問題になる。 . . . ".

The program 141 extracts single character type strings of " . . . ", "。", "携帯電話", "の", "使用時", "の", "マナー", "が", "問題", "になる", "." and " . . . " from the document 1.

Next the program 141 judges character types of the single character type strings, and calls the possibility comparison/characteristic string extraction program 142 to extract the characteristic strings of Kanji character strings of "携帯電話", and "使用時" and a Katakana character string of "マナー", and also to extract the character strings other than the Kanji and Katakana character strings, that is, "の", "の", "が", "になる" and "." as characteristic strings.

The specific processing example of the characteristic string extraction program 141 has been explained above.

Figure 26:
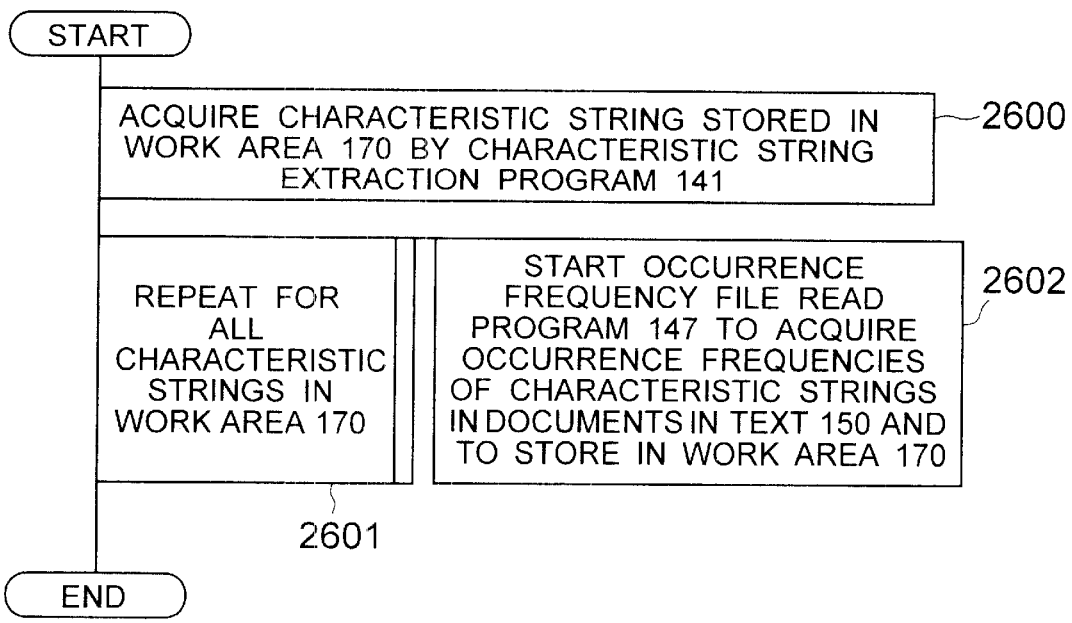
FIG. 26 is a PAD showing a procedure of processing operations of an occurrence frequency acquirement program 146 in the first embodiment of the present invention.

Explanation will next be made as to a processing procedure of the occurrence frequency acquirement program 146 to be activated by the characteristic string extraction program 131 in the step 1404 of FIG. 14, by referring to a PAD of FIG. 26.

The occurrence frequency acquirement program 146 acquires the characteristic strings stored in the work area 170 in the step 1402 of FIG. 14 (step 2600).

The program 146 executes the executes a step 2602 with respect to all the characteristic strings stored in the work area 170 (step 2601).

In the step 2602, the program 146 activates the occurrence frequency file read program 147 to acquire occurrence frequencies of the characteristic strings in the documents in the text 150 and to store them in the work area 170.

The processing procedure of the occurrence frequency acquirement program 146 has been explained above.

Figure 17:
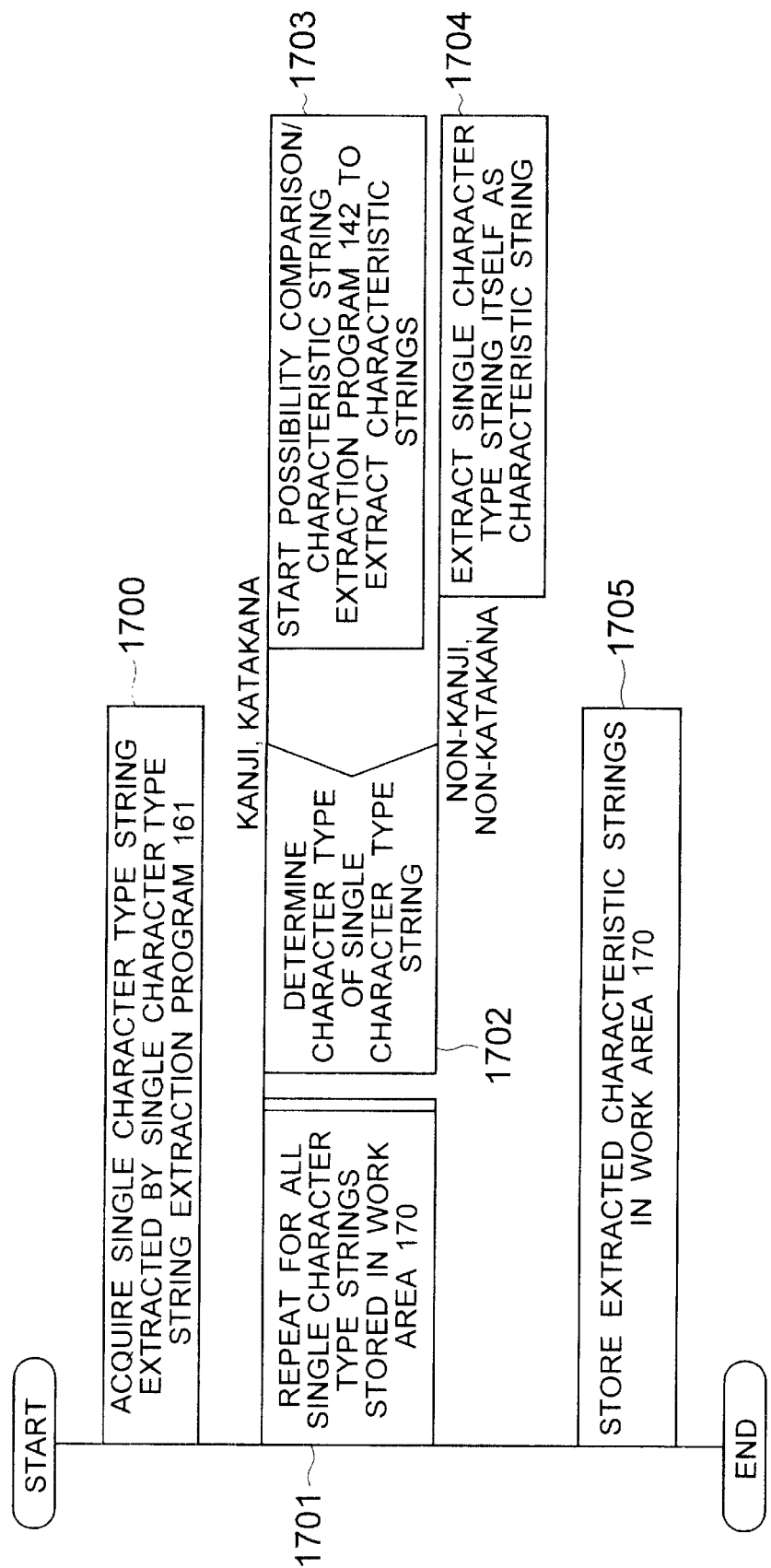
FIG. 17 is a PAD showing a procedure of processing operations of a characteristic string extraction program 141 in the first embodiment of the present invention.
Figure 18:
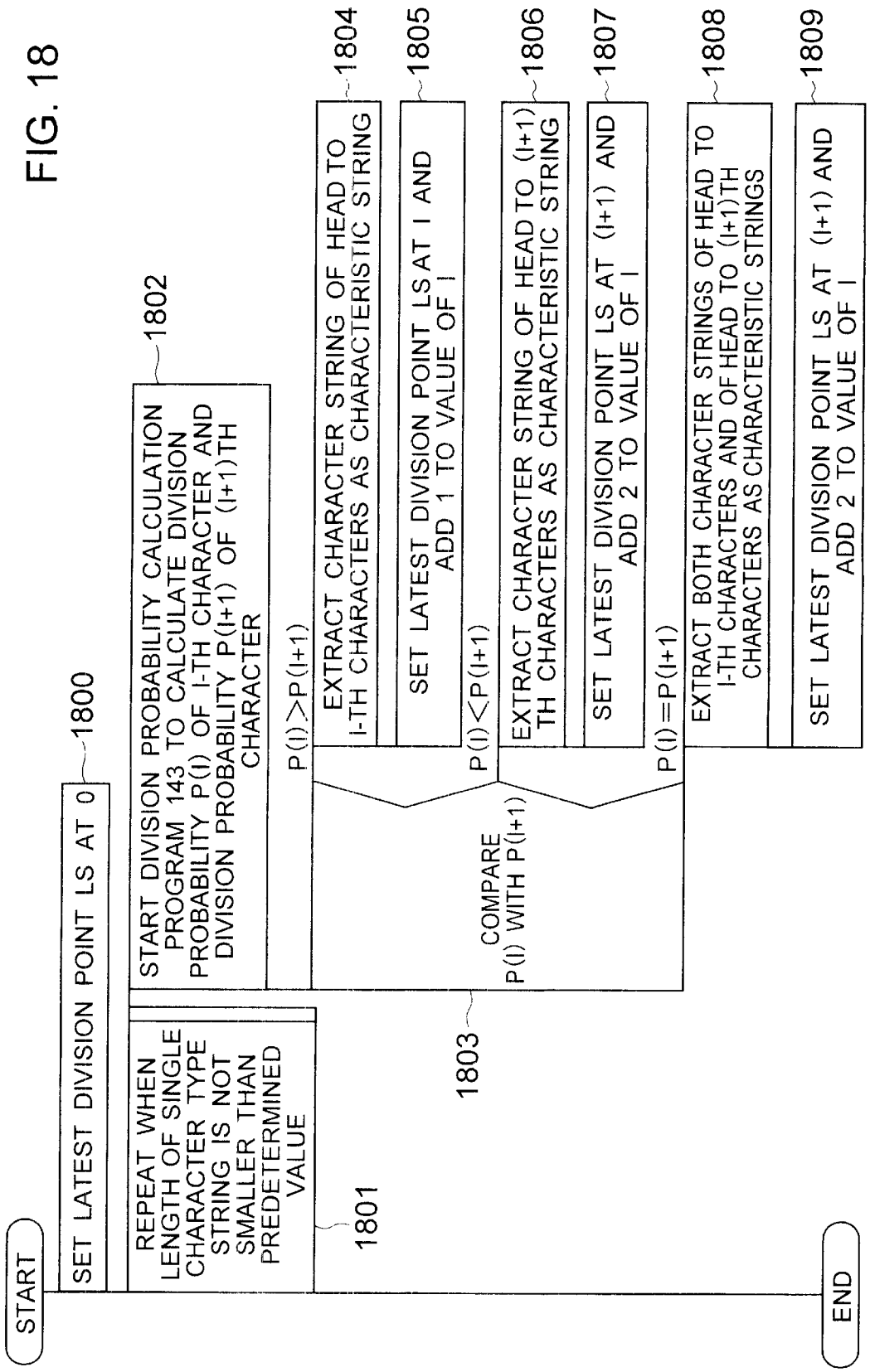
FIG. 18 is a PAD showing a procedure of processing operations of a program 142 (which will be referred to as the possibility comparison/characteristic string extraction program 142, hereinafter) for comparison of division probabilities and for extraction of a characteristic string in the first embodiment of the present invention.

Explanation will then be made as to a processing procedure of the possibility comparison/characteristic string extraction program 142 to be activated by the characteristic string extraction program 141 in the step 1703 of FIG. 17, with reference to a PAD of FIG. 18.

In a step 1800, the possibility comparison/characteristic string extraction program 142 sets 0 as an initial value of a tail character position (which will be referred to as the latest division point) LS of the last-extracted characteristic string.

The program 142 repetitively executes subsequent steps 1802 to 1809 when the length of the input single character type string extracted in the step 1703 of FIG. 17 is a predetermined value or more (step 1801).

In the step 1802, the program 142 starts the division probability calculation program 143 (which will be explained later) to calculate a division probability P(i) of the i-th character and a division probability P(i+1) when counted from the head of the single character type string.

In the next step 1803, the program 142 compares the division probabilities P(i) and P(i+1) calculated by the above division probability calculation program 143. When the division probability P(i) is larger than the division probability P(i+1), the program 142 executes the step 1804. When the division probability P(i) is smaller than the division probability P(i+1), the program 142 executes the step 1806. When the division probability P(i) is equal to the division probability P(i+1), the program 142 executes the step 1808.

In the step 1804, the program 142 extracts a character string of first to i-th characters when counted from the head character of the single character type string as a characteristic string. And in the step 1805, the program 142 sets the latest division point LS at i and adds 1 to the value i.

In the step 1806, the program 142 extracts a character string of the first to (i+1)th characters in the single character type string as a characteristic string. And in the step 1807, the program 142 sets the latest division point LS at (i+1) and adds 2 to the value i.

In the step 1808, the program 142 extracts a character string of the i-th to (i+1)th characters when counted from the head character of the single character type string as a characteristic string. And in the step 1809, the program 142 sets the latest division point LS at (i+1) and adds 1 to the value i.

The processing procedure of the possibility comparison/characteristic string extraction program 142 has been explained above.

A processing procedure of the possibility comparison/characteristic string extraction program 142 shown in FIG. 18 will be explained in connection with a specific example.

Figure 8:
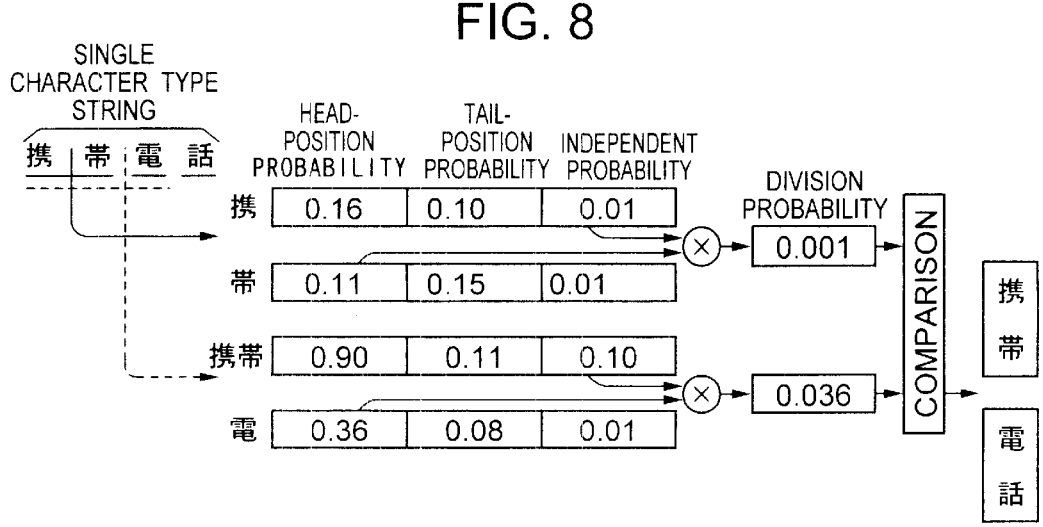
FIG. 8 shows a processing example when a program for comparison of division probabilities and for extraction of a characteristic string is applied to a Kanji character string in the first embodiment of the present invention.
Figure 9:
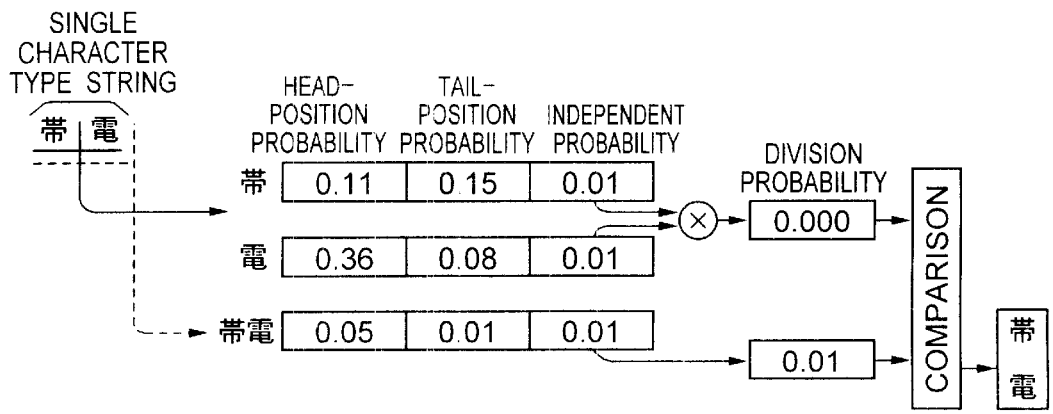
FIG. 9 shows an example of how to extract a characteristic string in the present invention.

FIG. 8 shows an example of how to extract characteristic strings from the single character type string of "携帯電話" extracted from the above document 1 of " .... 携帯電話 の使用時 のマナーが 問題になる。 ....".

A division probability P(1) of the first character in "携帯電話" is calculated to be 0.001 as a product of an independent probability of 0.01 of "携" and a head-position probability of 0.11 of "帯" and a division probability P(2) of the second character in "携帯電話" is calculated to be 0.036 as a product of an independent probability of 0.10 of "携帯" and a head-position probability of 0.36 of "電". Next these division probabilities are compared and the single character type string of "携帯電話" is divided at the larger probability character. In this case, since the division probability P(2) (=0.036) of the second character is larger than the division probability P(1) (=0.000) of the first character, the single character type string of "携帯電話" is divided into "携帯" and "電話".

Figure 20:
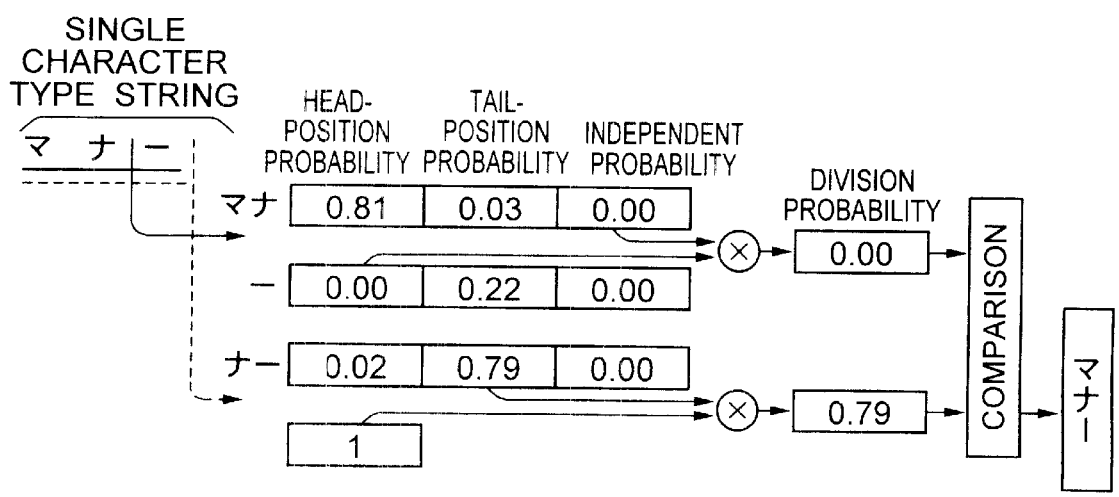
FIG. 20 shows a processing example when the possibility comparison/characteristic string extraction program 142 is applied to a Katakana character string in the first embodiment of the present invention.

FIG. 20 shows an example of how to extract a characteristic string from the single character type string "マナー" extracted from the above document 1. First, a division probability P(2) of the second character in the "マナー" is calculated to be 0.00 as a product of an independent probability of 0.00 of "マナ" and an independent probability of 0.00 of "ナー". Next a division probability P(3) of the third character, that is, a possibility that "マナー" appears as a single character type string itself is calculated to be 0.79 as a product of a tail-position probability of 0.79 of "ナー" and 1.0. These values are compared and the single character type string is divided at the larger probability character. In this case, since the division probability P(3) (=0.79) of the third character is larger than the division probability P(2) (=0.00) of the second character in "マナー", the single character type string is divided at the third character, with the result that the single character type string of "マナー" is not divided.

The specific processing procedure of the possibility comparison/characteristic string extraction program 142 has been explained above.

Figure 19:
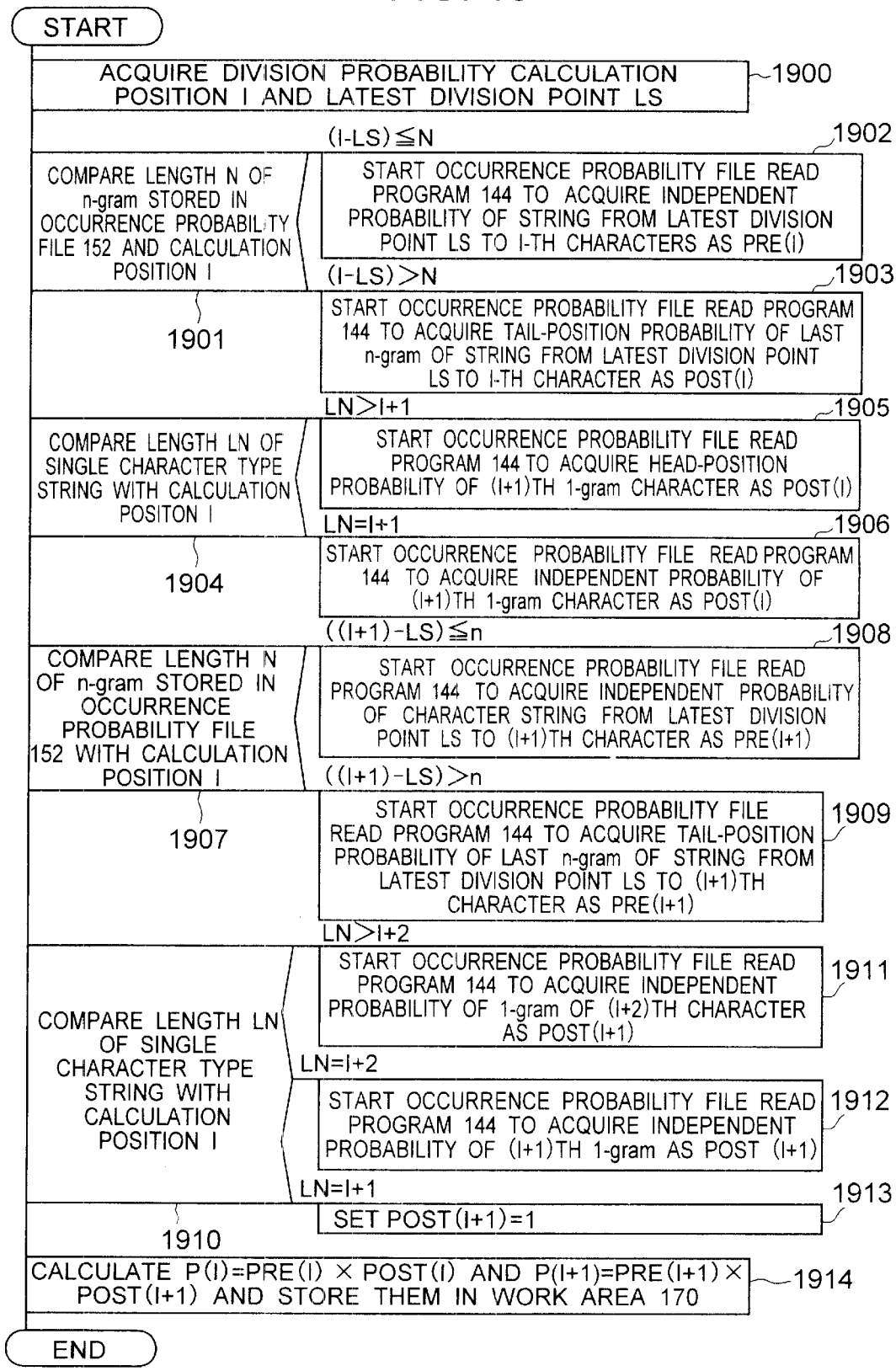
FIG. 19 is a PAD showing a procedure of processing operations of a division probability calculation program 143 in the first embodiment of the present invention.

Explanation will then be made as to a processing procedure of the division probability calculation program 143 to be activated by the possibility comparison/characteristic string extraction program 142 in the step 1801 of FIG. 18, with reference to a PAD of FIG. 19.

In a step 1900, the division probability calculation program 143 acquires a calculation position i and the latest division point LS specified in the step 1801 of FIG. 18.

Next in order to calculate a division probability P(i) at the calculation position i, the program 143 executes steps 1901 to 1906 to acquire each occurrence probability.

In the step 1901, first, the program 143 compares a length n of the n-gram extracted in the step 1201 of FIG. 12 with the calculation position i of the division probability. When (i-LS) is not larger than n, the program 143 executes the step 1902; whereas, when (i-LS) is larger than n, the program 143 executes the step 1903.

In the step 1902, the program 143 starts the occurrence probability file read program 144 to acquire an independent probability of the first to i-th characters from the latest division point LS and to set an occurrence probability Pre(i) of a character string located forward of the division probability calculation position i.

In the step 1903, the program 143 starts the occurrence probability file read program 144 to acquire a tail-position probability of a last n-gram of a character string of from the latest division point LS to i-th characters and to set an occurrence probability Pre(i) of a character string located forward of the division probability calculation position i.

In the next step 1904, the program 143 compares the length Ln of a single character type string with the division probability calculation position i. When Ln is larger than (i+1), the program 143 executes the step 1905, whereas, when Ln is equal to (i+1), the program 143 executes the step 1906.

In the step 1905, the program 143 starts the occurrence probability file read program 144 to acquire a head-position probability of the (i+1)th 1-gram and to set an occurrence probability Post (i) of a character string after the division probability calculation position i.

In the step 1906, the program 143 starts the occurrence probability file read program 144 to acquire an independent probability of the (i+1)th 1-gram and to set an occurrence probability Post(i) of a character string after the division probability calculation position i.

In order to calculate a division probability P(i+1) at a calculation position (I=1), the program 143 executes steps 1907 to 1913 and acquire occurrence probabilities.

In the step 1907, the program 143 compares the length n of the n-gram extracted in the step 1201 of FIG. 12 with the calculation position i of the division probability. When ((i+1)-LS) is not larger than n, the program 143 executes the step 1908, while, when ((i+1)-LS) is larger than n, the program 143 executes the step 1909.

In the step 1908, the program 143 starts the occurrence probability file read program 144 to acquire an independent probability of a character string of from the character at the latest division point LS to the (i+1)th characters and to set an occurrence probability Pre(i+1) of a character string before the division probability calculation position (i+1).

In the step 1909, the program 143 starts the occurrence probability file read program 144 to acquire a tail-position probability of a last n-gram of the string from the latest division point LS to the (i+1)th character and to set an occurrence probability Pre(i+1) of a character string after the division probability calculation position (i+1).

In the step 1910, the program 143 compares an length Ln of a single character type string with the division probability calculation position i. When Ln is larger than (i+2), the program 143 executes the step 1911; when Ln is equal to (i+2), the program 143 executes the step 1912, and when Ln is equal to (i+1), the program 143 executes the step 1913.

In the step 1911, the program 143 starts the occurrence probability file read program 144 to acquire a head-position probability of a 1-gram at the (i+2)th character and to set an occurrence probability Post(i+1) of a character string after the division probability calculation position (i+1).

In the step 1912, the program 143 starts the occurrence probability file read program 144 to acquire an independent probability of the 1-gram at the (i+2)th character and to set an occurrence probability Post(i+1) of a character string after the division probability calculation position (i+1).

In the step 1913, the program 143 sets the occurrence probability Post(i+1) of a string after the division probability calculation position (i+1) to be equal to 1.

In the step 1914, the program 143 sets a product of the occurrence probability Pre(i) acquired through the above steps 1901 to 1903 and the occurrence probability Post(i) acquired through the above steps 1904 to 1906 as the division probability P(i) at the calculation position i; whereas, the program 143 sets a product of the occurrence probability Pre(i+1) acquired through the above steps 1907 to 1909 and the occurrence probability Post(i+1) acquired through the above steps 1910 to 1913 as the division probability P(i+1) at the calculation position (i+1).

The processing procedure of the division probability calculation program 143 has been explained above.

Explanation will next be made as to a processing procedure of the division probability calculation program 143 shown in FIG. 19 with use of a specific example.

FIG. 28 shows an example of how to calculate division probabilities of the single character type string of "携帯電話" extracted from the above document 1 of " .... 携帯電話 の使用時 のマナーが 問題になる。 ...". In the illustrated example, it is assumed that n-grams stored in the occurrence probability file 152 have a length of 2 and the i-th character for calculation of the division probability is the first character. In other words, the following explanation will be made to calculate a division probability P(1) at the first character and a division probability P(2) at the second character.

In order to confirm whether or not independent probabilities of character strings to the first character are already stored in an occurrence probability file 600, the program 143 first compares a length of 2 of the n-gram stored in the occurrence probability file 600 with a division probability calculation position of 1. As a comparison result, the length of the stored n-gram is longer, so that the program 143 acquires 0.01 of the independent probability of the character string "携" of up to the first character from the occurrence probability file 600.

In order to confirm how many characters are present backwards of the division probability calculation position, the program 143 compares a length 4 of the single character type string "携帯電話" with the division probability calculation position of 1. Since there is present a character string "帯電話" of 2 or more characters, the program 143 acquires the head-position probability of 0.11 of "帯" from the occurrence probability file 600. And the program 143 calculates a product of 0.01 of the independent probability of "携" and 0.11 of the head-position probability of "帯" to acquire a division probability P(1) (=0.001) at the first character.

Similarly, in order to confirm whether or not independent probabilities of character strings of the first to second character which is the division probability calculation position are already stored in the occurrence probability file 600, the program 143 compares a length 2 of the n-gram stored in the file 600 with the division probability calculation position of 2. Since the length of the stored n-gram is equal to the calculation position, the program 143 acquires an independent probability of 0.10 of the character string "携帯" from the occurrence probability file 600.

Next in order to confirm how many characters are present backwards of the division probability calculation position, the program 143 compares a length 4 of the single character type string "携帯電話" with the division probability calculation position of 2. Since there is present a character string "電話" of 2 characters, the program 143 acquires the head-position probability of 0.36 of "電" from the occurrence probability file 600. And the 'program 143 calculates a product of 0.10 of the independent probability of "携帯" and 0.36 of the head-position probability of to acquire a division probability P(2) (=0.036) at the second character.

The specific processing procedure of the division probability calculation program 143 has been explained above.

The first embodiment of the present invention has been described above.

In the present embodiment, the processing procedure of the division probability calculation program 143 has been explained in connection with the case where the n-grams stored in the occurrence information file 151 and occurrence probability file 152 have a length of 2. However, it will be appreciated that the length may be a fixed value of 1 or 3, be a variable value based on information about occurrence probability and so on in the database, be the length m of the single character type string itself, or be a combination thereof, which enables realization of the similar extracting operation of the characteristic string.

Further, although the processing procedure of the division probability calculation program 143 has been explained to search for a document or documents having contents similar to contents of the seed document in the present embodiment, it will be seen that the seed document may be replaced by a specified text to similarly extract characteristic strings and to realize the relevant document searching operation.

In the present embodiment, the processing procedure of the possibility comparison/characteristic string extraction program 142 has been explained in connection with the example where the division probability of a character string of the head to n-th characters in the single character type string is compared with the division probability of a character string of the head to (n+1)th characters. However, it will be seen that the similar extraction of characteristic strings indicative of features in the document can be realized even by comparing the division probability of a character string of characters of the tail to n-th characters backwards in the single character type string with the division probability of the tail to (n+1)th characters backwards or by comparing the division probability of a character string of m character(s) (m being an integer of 1 or more) in the single character type string with the division probability of a character string of n character(s).

The present embodiment has been explained above having the arrangement including the possibility comparison/ characteristic string extraction program 142 for the Kanji or Katakana single character type string. When the present invention is desired to use for a database not containing Kanji or Katakana, however, the invention may be arranged not to include the corresponding possibility comparison/ characteristic string extraction program 142, to include the corresponding possibility comparison/characteristic string extraction program 142 suitable for non-Kanji or non-Katakana, or to include the characteristic string extraction programs corresponding to the character types.

The present embodiment has been arranged to extract characteristic strings from the single character type string. However, the invention may be arranged to extract characteristic strings from substrings spanning a specific boundary between character types. In this case, for example, character strings of "F1", "ビタミンC", "W杯", and "ケイ素" can be searched and thus an accurater relevant document searching can be realized.

Further, the occurrence information file creation/ registration program 121 has regarded the character type boundary as the separation between words to count the head, tail and independent frequencies of each n-gram in the present embodiment. However, the program 121 may be arranged to regard an adjunct such as Joshi (Postpositional word functioning as an auxiliary to a main word) or Jodoushi (auxiliary verb) as a candidate of a break between words to count the head, tail and independent frequencies of each n-gram.

Figures 4, 5:
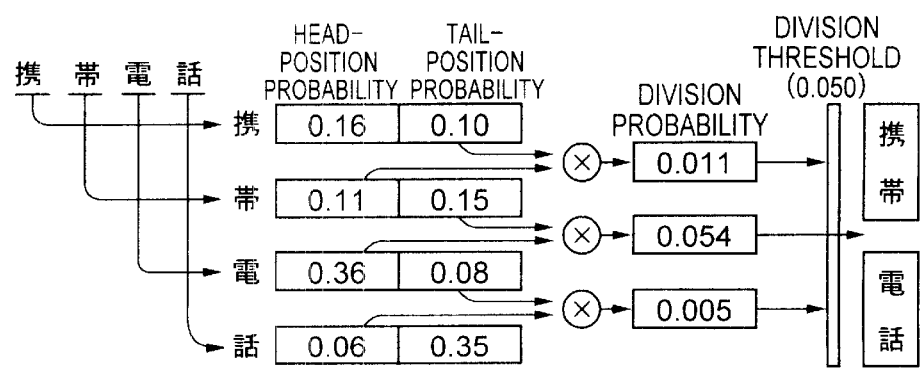
FIG. 4 shows an example of an characteristic string extracting method in the prior art 3.
FIG. 5 shows an exemplary occurrence information file in accordance with the present invention.

In the method of the present embodiment, the occurrence information file 151 has been created in the form of such a table as shown in FIG. 5. However, since increase in the length of the objective n-gram causes increase in the number of types of n-grams in the method, this requires a lot of time in the processing of the occurrence probability file creation/registration program 124. This problem can be solved by adding a searching index to a characteristic string. This results in that, even when the number of n-gram types is increased, high-speed registering operation can be reapplied. The searching index may be a full-text searching index 2901 or such a word index as disclosed in JP-A-8-329112. This problem, which occurs even in the occurrence probability file 152 and occurrence frequency file 153, can be eliminated by adding a similar searching index.

The present embodiment has been arranged to start the occurrence probability file creation/registration program 124 at the time of registering a document to create the occurrence probability file 152. In this connection, however, when the embodiment is arranged to calculate a corresponding occurrence probability on the basis of the occurrence probabilities of the n-grams stored in the occurrence information file 151 at the time of executing the possibility comparison/characteristic string extraction program 142 for searching operation of the a relevant document or documents, the number of files to be stored in the magnetic disk unit 105 can be reduced.

In the present embodiment, the relevant document searching system using the characteristic string extracted by the characteristic string extraction program 141 has been explained. However, the system may be used as a system for extracting a characteristic string from a seed document, or may be used in a system for extracting words contained in a document based on morphological analysis and automatically sorting documents using the extracted words, as described in JP-A-8-153121.

The possibility comparison/characteristic string extraction program 142 in the first embodiment compares the division probability P(i) at the i-th character with the division probability P(i+1) at the (i+1)th character and divides the single character type string at the larger probability character. For this reason the first embodiment has a problem that the program 142 extracts characteristic strings of (i+1) characters or less from all the single character type strings and erroneously divides words of characters longer than (i+1) characters.

Figure 22:
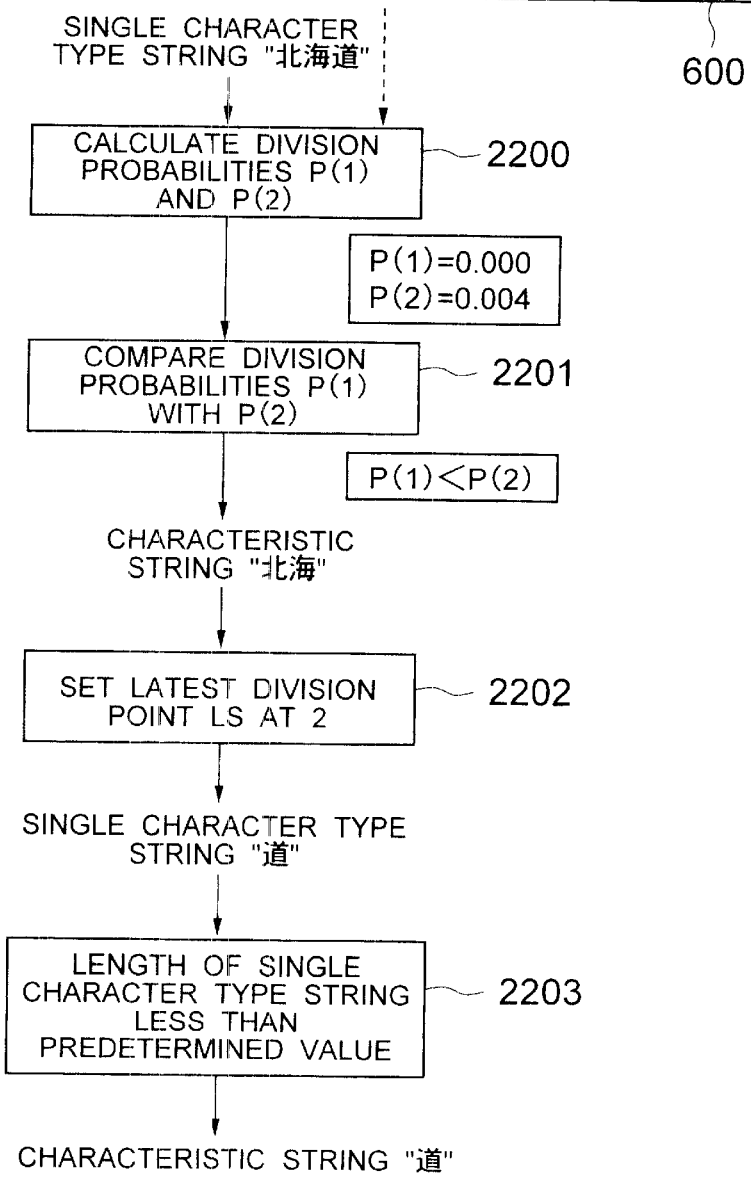
FIG. 22 is a PAD showing a procedure of processing operations of the possibility comparison/characteristic string extraction program 142 in the first embodiment of the present invention.

Explanation will be made as to an example when the above problem takes place that words of characters longer than (i+1) characters are erroneously divided by the program 142 in the first embodiment, with use of a specific example shown in FIG. 22. It is assumed in the illustrated example that the single character type string is "北海道" of a Kanji type and has an initial value of 1 at the division probability calculation position i.

The possibility comparison/characteristic string extraction program 142 first starts the above division probability calculation program 143 in a step 2200 to calculate a division probability P(1) for the first character and a division probability P(2) for the second character. In the illustrated example, the program 142 calculates a probability P(1) of dividing the single character type string of "北海道" at the first character into "北" and "海道" to be 0.000 as a product of an independent probability of 0.03 for 1-gram "北" an independent probability of 0.00 for 2-gram "北". Similarly, the program 142 calculates a probability P(2) of dividing the single character type string of "北海道" at the second character into "北海" and "道" to be 0.004 as a product of an independent probability of 0.03 for a 2-gram word "北海" and an independent probability of 0.12 for a 1-gram word "道".

In a next step 2201, the program 142 determines larger one of the probabilities P(1) and P(2) calculated in the step 2200 as a division point and extracts a character string of the head to division point characters in the single character type string as a characteristic string. In the illustrated example, since the probability P(2) is larger than the probability P(1), the single character type string of "北海道" is divided at the second character to extract a characteristic string "北海" of the first to second characters as a characteristic string.

In a next step 2202, the program 142 sets the position LS (which will be referred to as a latest division point, hereinafter) of a tail character in a last-extracted characteristic string at 2, and continues to perform its characteristic string extracting operation over the single character type string "道" subsequent to the latest division point.

In a next step 2203, the program 142 extracts the single character type string "道" as a characteristic string, because the length 1 of the character string "道" is less than a predetermined length of 2. As a result, a document of " . . . 道の駅と呼ばれるサービスエリアが国道沿いに建設されること になった。 (a service area named "Michi's Eki" was built along a national road) . . . " is erroneously searched as a relevant document.

The processing example of the possibility comparison/characteristic string extraction program 142 in the first embodiment has been explained above. In the illustrated example, since the program 142 compares the division probabilities P(1) and P(2) of the first and second characters and uses larger one of the probabilities as a division point, the program extracts "北海" and "道" from the single character type string "北海道" as characteristic strings, which undesirably results in that a document or documents shifted from the central concept of the seed document are searched.

To avoid this, the second embodiment of the relevant document searching system of the present invention is arranged so that, only when the division probability calculated at the time of extracting a characteristic string from a single character type string is higher than a predetermined value (which will be referred to as a division threshold, hereinafter), the system perform its comparing operation to extract a characteristic string longer in length than (i+1) characters.

Figure 21:
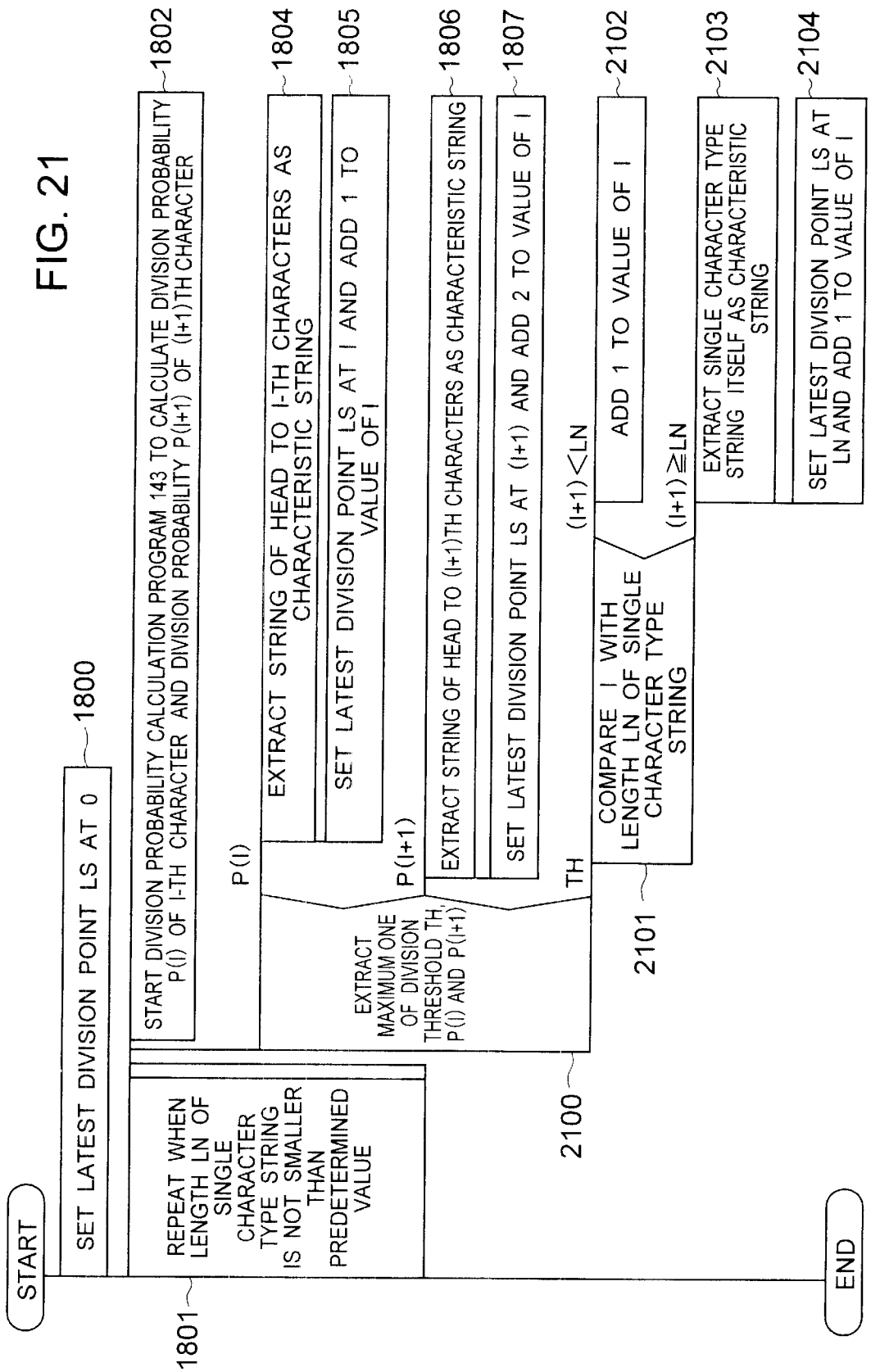
FIG. 21 is a PAD showing a procedure of processing operations of a program 142a for comparison of division probabilities and for extraction of a characteristic string (which will be referred to as the possibility comparison/characteristic string extraction program 142a, hereinafter) in a second embodiment of the present invention.

The present embodiment has substantially the same arrangement as the first embodiment (FIG. 1), except that, unlike the processing procedure of the possibility comparison/characteristic string extraction program 142, steps 2100 to 2104 are added as shown in a PAD of FIG. 21.

Explanation will be then made as to a processing procedure of the possibility comparison/characteristic string extraction program 142a in the second embodiment, by referring to the PAD of FIG. 21.

In a step 1800, the possibility comparison/characteristic string extraction program 142a sets the initial value of the latest division point LS at 0.

When the length of a single character type string for extraction of a characteristic string therefrom is not less than a predetermined value, the program 142a repetitively executes steps 1802 to 1807 and 2101 to 2103 (step 2100).

In a step 1802, the program 142a starts the division probability calculation program 143 to calculate a division probability P(i) of the i-th character in the single character type string when counted from its head character as well as a division probability P(i+1) of the (i+1)th character.

In the next step 2100, the program 142a compares the values of the division probabilities P(i) and P(i+1) calculated by the above division probability calculation program 143 and the value of the predetermined division threshold Th to extract maximum one among these values. When the program 142a extracts the division probability P(i) as a result of the above comparison, the program 142a executes the step 1804; when the program 142a extracts the division probability P(i+1), the program executes the step 1806; and when the program 142a extracts the division threshold Th, the program executes the step 2101.

In the step 1804, the program 142a extracts a character string of the first to i-th characters in the single character type string as a characteristic string. And in the step 1805, the program 142a sets the latest division point LS at i and adds 1 to the value of i.

In the step 1806, the program 142a extracts a character string of the head to (i+1)th characters in the single character type string as a characteristic string. And in the step 1807, the program 142a sets the latest division point LS at (i+1) and adds 2 to the value of i.

In the step 2101, the program 142a compares the division probability calculation position i with the length Ln of the single character type string. When (i+1) is smaller than the character string length Ln, the program 142a executes the step 2102; while, when (i+1) is not smaller than the character string length Ln, the program 142a executes the step 2103.

In the step 2102, the program 142a adds 1 to the value of the division probability calculation position i.

In the step 2103, the program 142a extracts the single character type string itself as a characteristic string. And in the step 2104, the program 142a sets the latest division point LS to be equal to the character string length Ln and adds 1 to the value of i.

The processing procedure of the possibility comparison/characteristic string extraction program 142a has been explained above.

Figure 23:
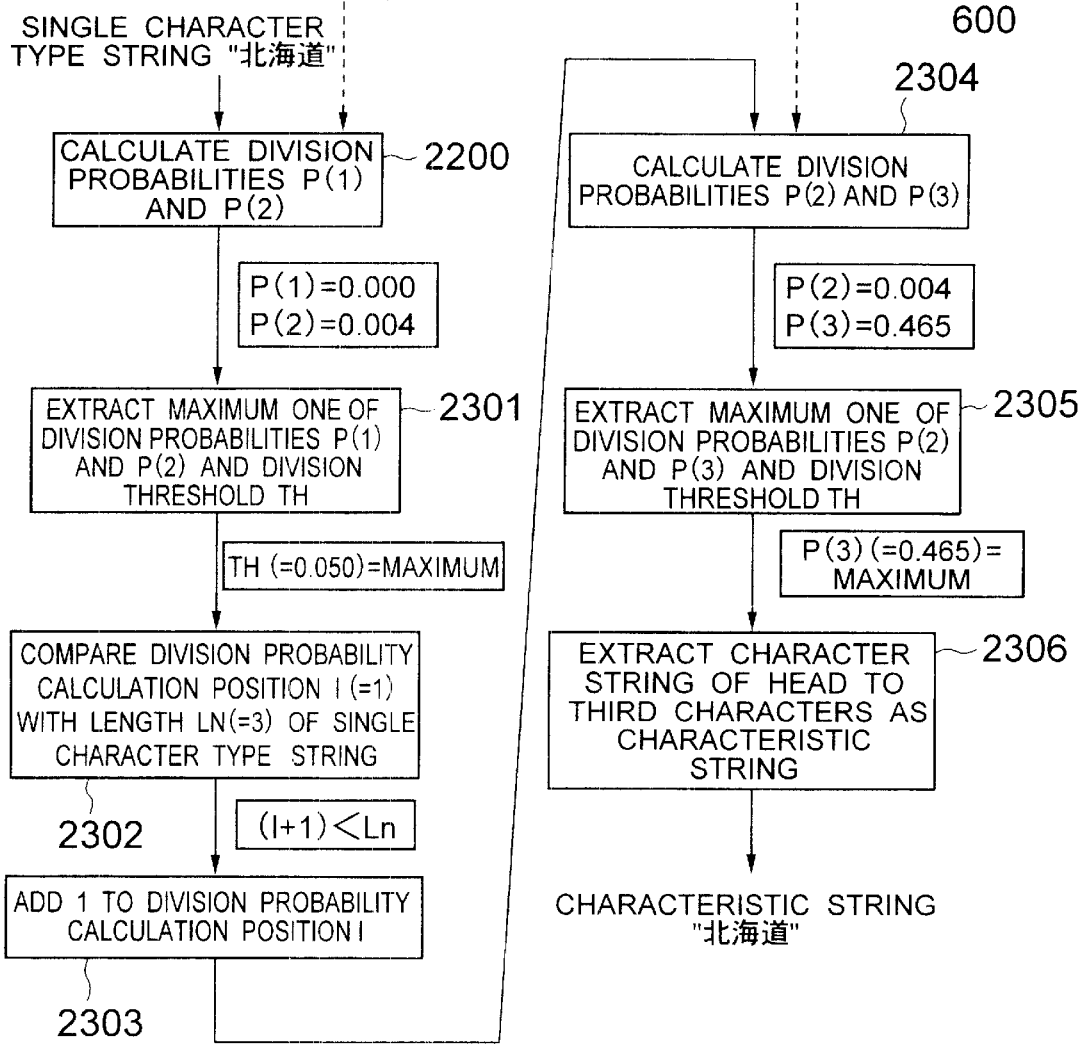
FIG. 23 is a PAD showing a procedure of processing operations of the possibility comparison/characteristic string extraction program 142a in the second embodiment of the present invention.
Figure 24:
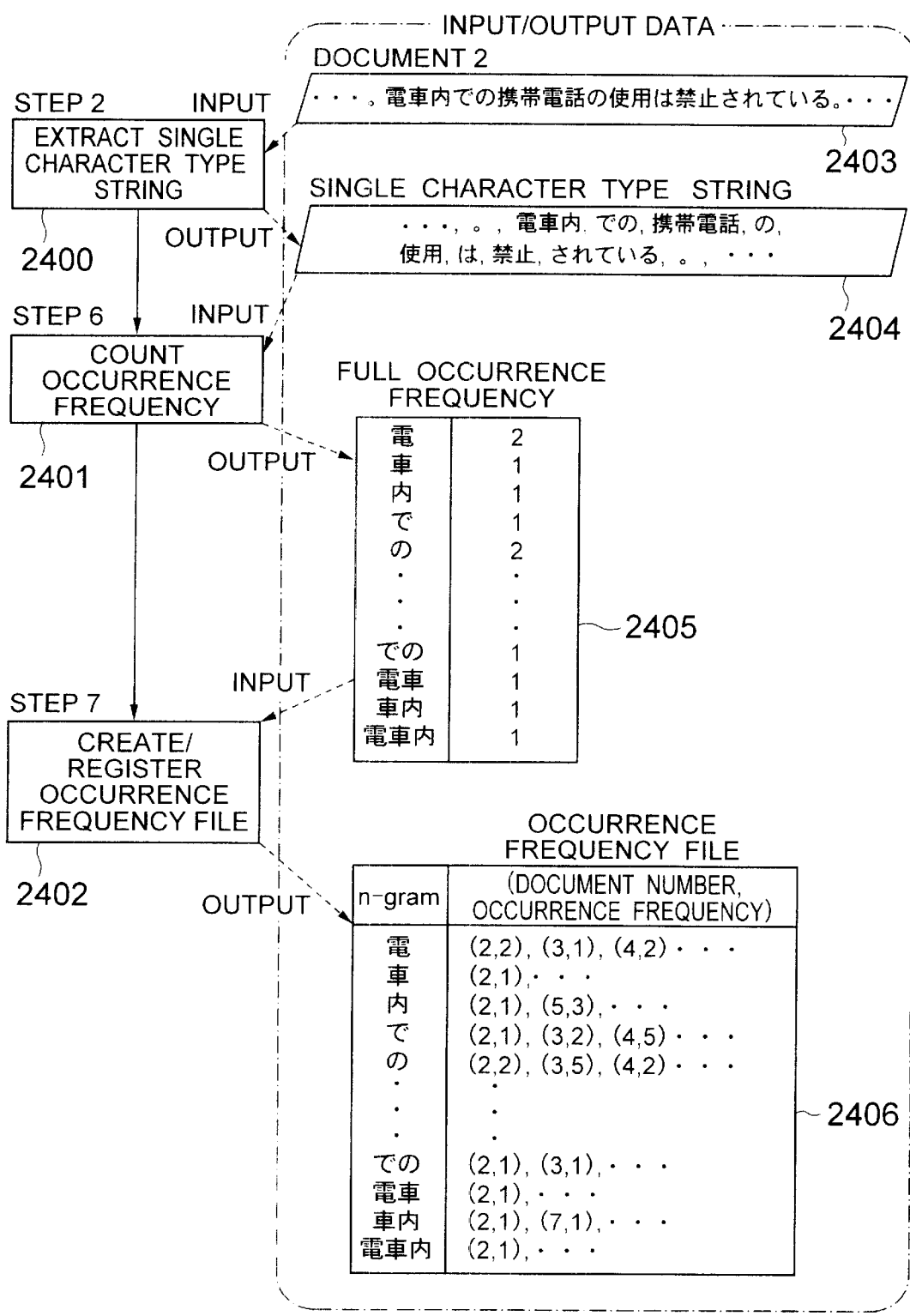
FIG. 24 shows a procedure of operations of creating an occurrence frequency file in accordance with the present invention.

The processing procedure of the possibility comparison/characteristic string extraction program 142a in the second embodiment will be explained in connection with a specific example of FIG. 23. In this example, it is assumed that a character string "北海道" of Kanji characters is used as a single character type string, the division threshold Th has a value of 0.050, and the division probability calculation position i has an initial value of 1.

In a step 2200, the possibility comparison/characteristic string extraction program 142a first starts the division probability calculation program 143 to calculate the division probability P(1) of the first character and the division probability P(2) of the second character and to obtain P(1)=0.000 and P(2)=0.004.

In the step 2301, the program 142a extracts maximum one of the division probabilities P(1) and P(2) calculated in the step 220 and the division threshold Th. Since this results in extraction of the maximum division threshold Th, the program 142a compares in a step 2302 the division probability calculation position i(=1) with the length Ln(=3) of the single character type string "北海道". As a result of the comparison, since the division probability calculation position i is smaller than the length Ln, the programs 142a adds 1 to the value of i.

In a step 2304, the program 142a calculates the division probability P(2) of the second character and the division probability P(3) of the third character in the single character type string. In this example, the program 142a calculates a possibility of dividing "北海道" at the second character into "北海" and "道" as a product P(2)(=0.004) of an independent probability of 0.03 of the 2-gram word "北海" and an independent probability of 0.12 of the 1-gram word "道" whereas, the program calculates a possibility of occurrence as the word "北海道" of the head to third characters as a produce P(3)(=0.465) of a head-position probability of the 2-gram word "北海" and a tail-position probability of the 2-gram "海道".

In a next step 2305, the program 142a extracts maximum one of the division probabilities P(2) and P(3) calculated in the above step 2304 and the division threshold Th. Since this results in extraction of the maximum P(3), the program extracts the character string "北海道" of the head to third characters as a characteristic string.

As has been explained in the foregoing, in accordance with the present invention, only when the division probability is higher than the division threshold, comparing operation is carried out, so that the division of the single character type string at a position where division will not done from a language viewpoint can be avoided. For this reason, the number of unsuitable characteristic strings extracted in the first embodiment can be reduced to a large extent. Thus the invention can search for the suitable concept indicative of the seed document and a document or documents similar thereto at high speed.

Explanation will next be made as to a third embodiment of the present invention, with reference to FIG. 29.

In the first and second embodiments, it is necessary to previously store all possible character strings to be extracted as characteristic strings in the occurrence frequency file 153. This results in that, as the number of types in the character strings increases, it takes a lot of time to acquire occurrence frequencies of documents in the database, thus demanding an increased capacity of magnetic disk.

The third embodiment of the relevant document searching system of the present invention is arranged so that, in order to acquire occurrence frequencies of documents in the database with respect to characteristic strings extracted from the seed document, not the occurrence frequency file 153 but a full-text searching index is used to reduce the necessary capacity of magnetic disk.

That is, in accordance with the present embodiment, a full-text searching system is used to acquire occurrence frequencies of documents in the database in the first embodiment, whereby the system can realize searching for a relevant document or documents at high speed even when the database contains lots of types of character strings. Further, the occurrence frequency file 153 is replaced by the full-text searching index, so that, when the relevant document searching system is implemented in the form of a combination with the full-text searching system, the capacity of magnetic disk in the present embodiment can be made smaller than that in the first embodiment.

The present embodiment has substantially the same arrangement as the first embodiment (FIG. 1), but different therefrom in the occurrence frequency file read program 147 forming the occurrence frequency acquirement program 146 in the relevant document search program 131. This program is replaced by such a full-text search program 2902 as shown in FIG. 29.

Figure 30:
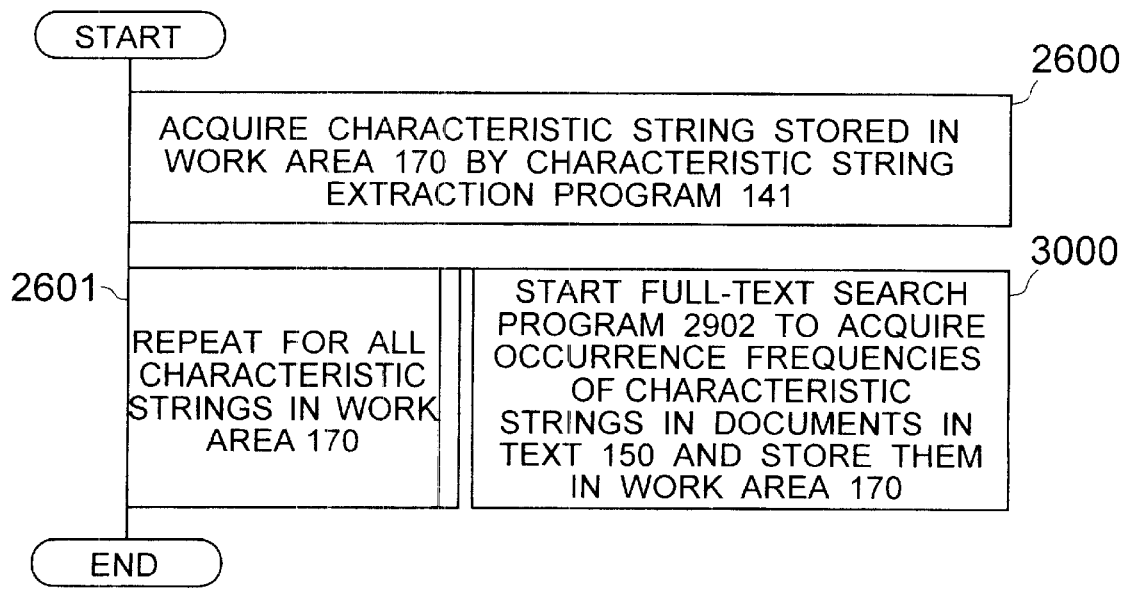
FIG. 30 shows a procedure of operations of executing an occurrence frequency acquirement program 146a in the third embodiment of the present invention.

Of the processing procedures of the present embodiment, a processing procedure of the occurrence frequency acquirement program 146a will be explained by referring to FIG. 30.

A difference of this program from the occurrence frequency acquirement program 146 (FIG. 26) is only an occurrence frequency acquiring step 3000. The other processing steps in the processing procedure are the same as explained in the first embodiment.

In the occurrence frequency acquiring step 3000, the full-text search program 2902 searches for characteristic strings stored in the work area 170 to acquire occurrence frequencies of the characteristic strings in documents in the text 150.

The full-text search program 2902 used in the occurrence frequency acquiring step 3000 in the present embodiment may be of any type. For example, such an n-gram index type may be employed as disclosed in JP-A-64-35627 (which will be referred to as the prior art 4, hereinafter).

Figure 29:
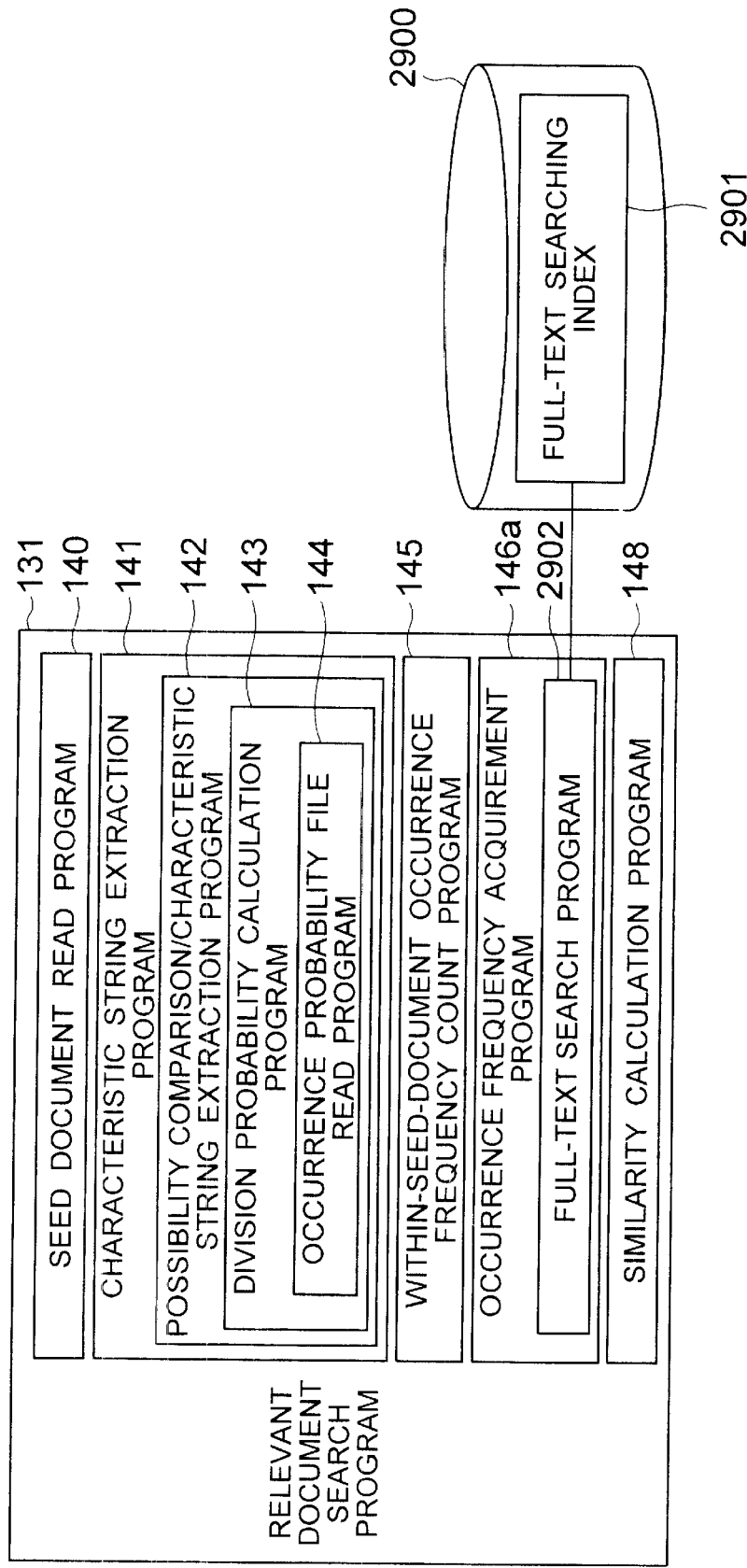
FIG. 29 shows an arrangement of the relevant document search program 131 in the third embodiment of the present invention.

The n-gram index system of the prior art 4, at the time of registering a document, extracts n-gram words from text data of the database registration document as well as occurrence positions of the n-gram words in the text and previously stores them in a magnetic disk unit 2900 as a full-text searching index 2901, as shown in FIG. 29. At the time of searching operation, the system extracts n-gram words appearing in a specified query term, reads out corresponding indexes from the full-text searching index 2901 in the magnetic disk unit 2900, compares occurrence positions of the n-gram words in the indexes, judges whether or not a positional relationship of the n-gram extracted from the query term is equal to a positional relationship of the n-gram in the index, whereby the system can search for a document or documents in which the specified query terms appear.

In this system, when characteristic strings are input to the full-text search program 2902 as query terms to acquire documents in which the characteristic strings appear and their positional information, occurrence frequencies of the characteristic strings in the documents can be obtained.

Figure 7:
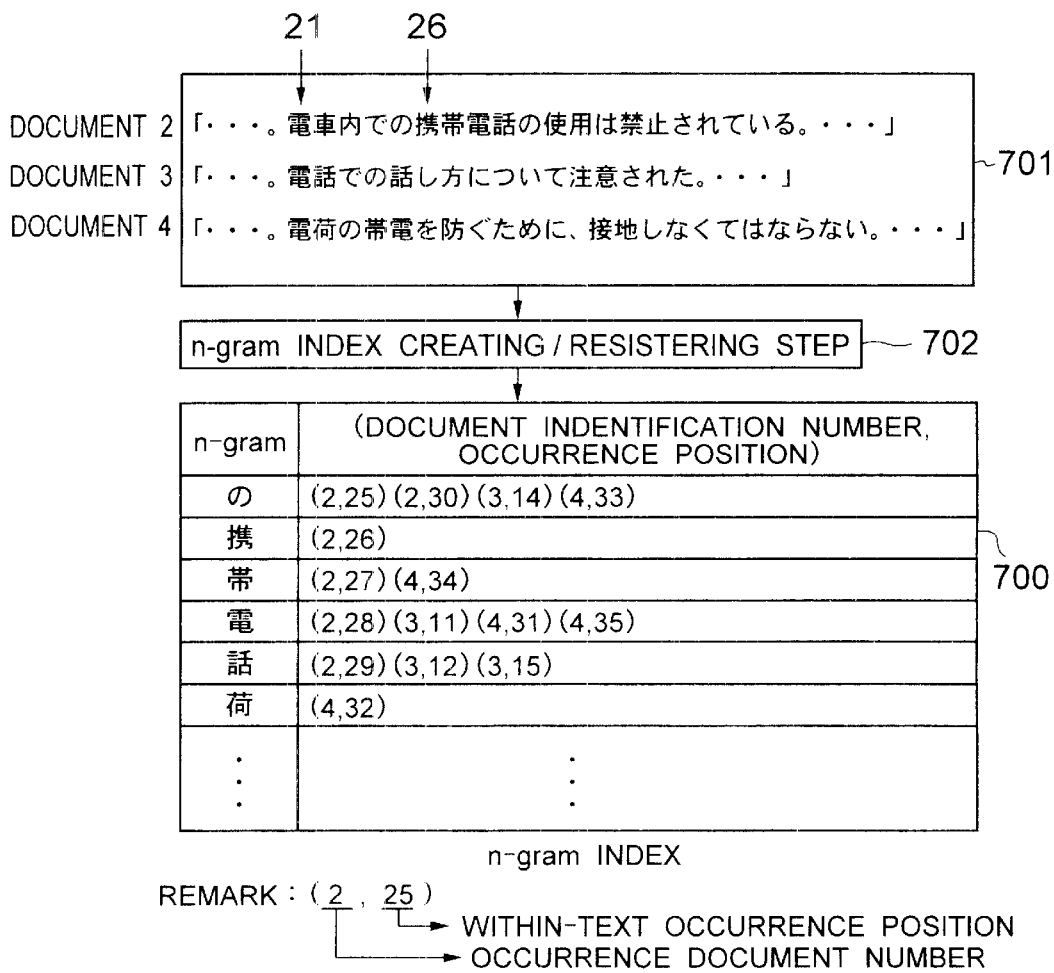
FIG. 7 shows an example of n-gram index in accordance with a third embodiment of the present invention.
Figure 15:
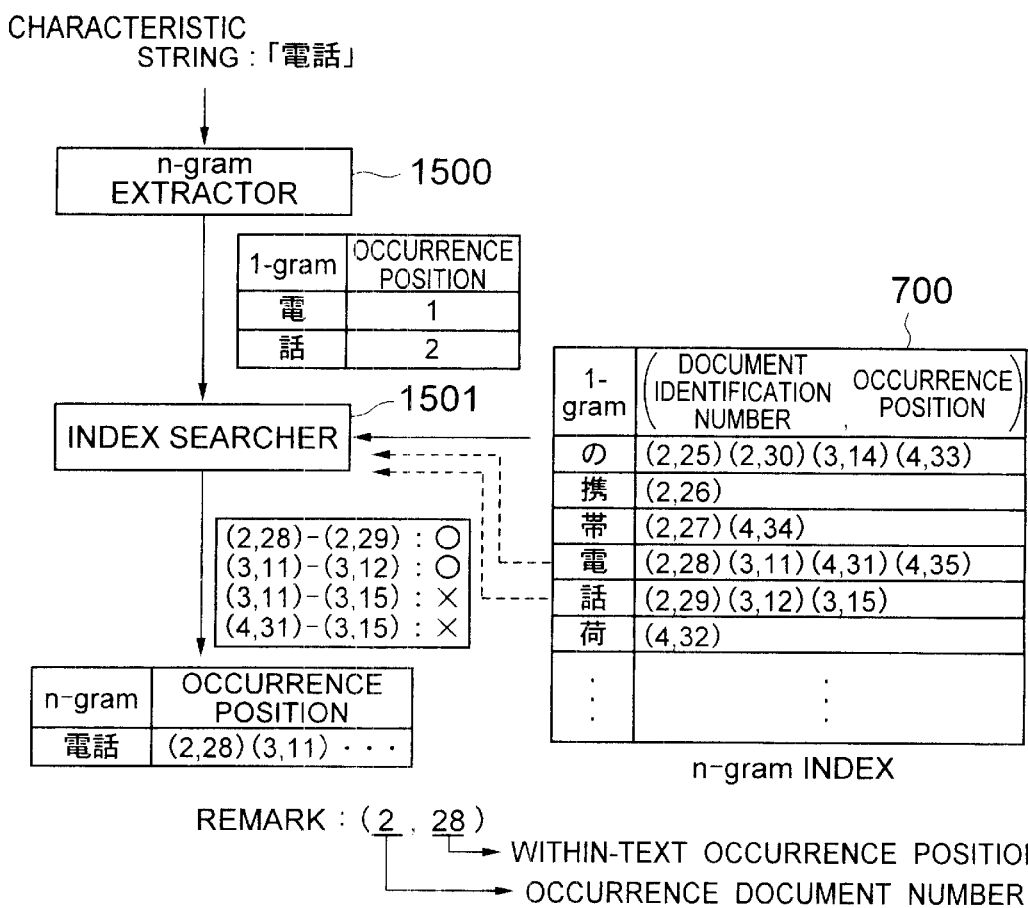
FIG. 15 shows example of how to acquire an occurrence frequency in the third embodiment of the present invention.

A method for acquiring an occurrence frequency in the prior art 4 will be detailed with reference to FIGS. 7 and 15. In this case, n in n-grams is assumed to have a value of 1.

Explanation will first be made as to a processing procedure in a document registration mode with use of FIG. 7. The system reads a text 701 for database registration into an n-gram index creating/registering step 702 to create an n-gram index 700. The index 700 stores all 1-grams appearing in the text 701 and occurrence positions of the 1-grams in the text.

Since the 1-gram "携" appears at the 26th character in a document having a document number of 2 in the text 701 in the illustrated text 701, the n-gram index 700 stores the 1-gram "携" and an occurrence position (2,26) associated therewith. That is, (2,26) indicates that this word appear at the 26th character in the document having a document number of 2.

Explanation will next be made as to a processing procedure in a search mode by referring to FIG. 15. In this case, explanation will be made in connection with an example where an occurrence frequency of the characteristic string "電話" extracted from the above document 1 of " .... 携帯電話の使用 のマナーが 問題になる。 ... " is acquired from the above n-gram index 700.

A characteristic string to be searched is first input to an n-gram extractor 1500 to extract all n-grams appearing in the characteristic string as well as occurrence positions of the n-grams. Next the extracted n-grams and the occurrence positions of the n-grams in the characteristic string are input to an index searcher 1501. In the index searcher 1501, indexes of the n-grams extracted from the characteristic string are read out from the n-gram index 700, ones of these indexes which coincide with each other in document number and have the same positional relationship as the positional relationship in the characteristic string is extracted and output as a searched result.

In the case of the example where "電話" is input as the characteristic string, in the n-gram extractor 1500, (1-gram "電", 1-gram position "1") and (1-gram "話", 1-gram position "2") are extracted. In this case, the n-gram position "1" indicates the head of the query term and the n-gram position "2" indicates the position of the character next thereto.

In the index searcher 1501, next, indexes corresponding to the 1-gram "電" and "話" are read out from the n-gram index 700. Ones of the indexes which have an identical occurrence document number and have continual occurrence positions such as n-gram position "1" and n-gram position "2", that is, adjacent ones are extracted and output as a searched result.

In this example, since (2, 28) of the 1-gram "電" and (2, 29) of the 1-gram "話" have an identical document number and have adjacent positions of "28" and "29", it is known that there is an n-gram "電話" as a character string and it is detected that the query term "電話" appears in the document 2. However, since (3, 11) of the 1-gram "電話" is not adjacent to (3, 15) of the 1-gram "話" it will be seen that the characteristic string "電話" does not appear at this position.

And the system obtains an occurrence frequency of the characteristic string by counting the occurrence position output as a searched result from the index searcher 1501.

As has been explained in the foregoing, in accordance with the present embodiment, when the characteristic string searching index of the occurrence frequency file and the full-text searching index in place of the occurrence frequency file are used, high-speed relevant document searching can be realized without causing increase of useless files.

Figure 31:
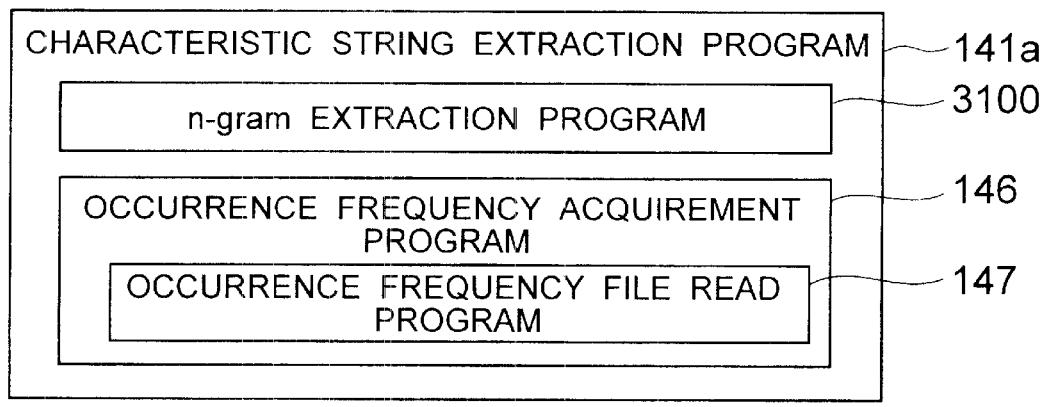
FIG. 31 shows a structure of a characteristic string extraction program 141a in a fourth embodiment of the present invention.

Explanation will then be made as to a fourth embodiment of the present invention with use of FIG. 31.

In the first, second and third embodiments, the division probability of a character string of the head to n-th characters in the single character type string extracted from the seed document has been compared with the division probability of a character string of the head to (n+1)th characters to extract a characteristic string. However, since this requires holding of the occurrence information file 151 and occurrence probability file 152, an increase in the number of types of character strings will cause an increase in the necessary capacity of magnetic disk.

The fourth embodiment of the relevant document searching system of the present invention is arranged to reduce the necessary capacity of magnetic disk by using the occurrence frequency file 153 in place of the occurrence information file 151 and occurrence probability file 152.

The fourth embodiment of the present invention is substantially the same in arrangement as the first embodiment (FIG. 1), but is different therefrom in the characteristic string extraction program 141 which forms the relevant document search program 131 and which includes an n-gram extraction program 3100 and the aforementioned occurrence frequency acquirement program 146.

Figure 32:
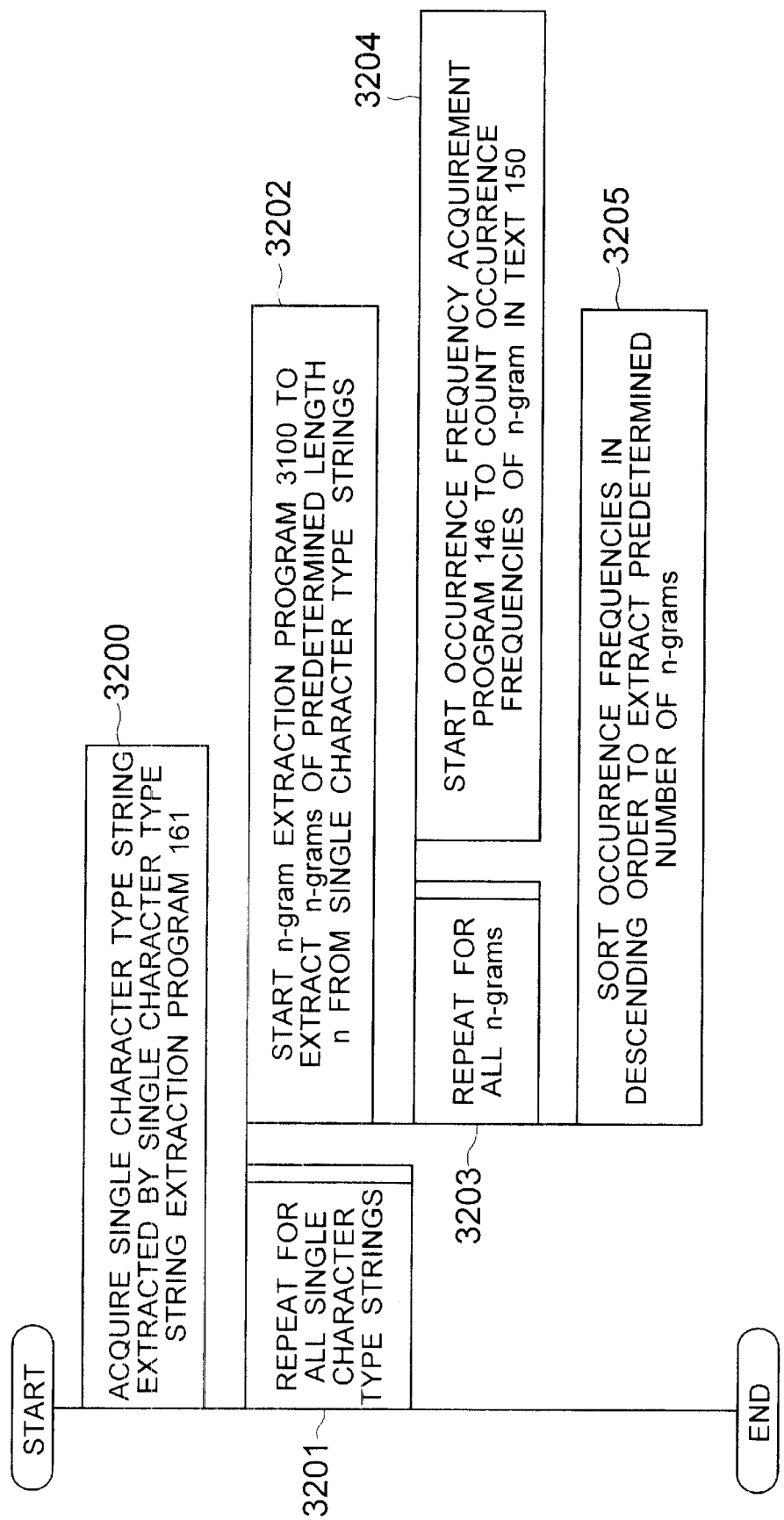
FIG. 32 is a PAD showing a procedure of processing operations of the characteristic string extraction program 141a in the fourth embodiment of the present invention.

Of the processing operations of the present embodiment, a processing procedure of the characteristic string extraction program 141a different from that in the first embodiment will be explained by referring to FIG. 32.

In a step 3200, the characteristic string extraction program 141a first starts the single character type string extraction program 161 to acquire all single character type strings stored in the work area 170.

In a next step 3201, the program 141a repetitively executes subsequent steps 3202 to 3205 with respect to all the single character type strings acquired in the above step 3200.

That is, the program 141a starts the n-gram extraction program 3100 to extract all n-grams from the single character type strings acquired in the step 3200 while shifting a predetermined length n (n being an integer of 1 or more) by every one character from the head character.

And in the step 3203, the program 141a repetitively executes the next step 3204 for all the n-grams extracted by the above n-gram extraction program 3100. That is, in the step 3204, the program 141a starts the occurrence frequency acquirement program 146 to acquire occurrence frequencies of the n-grams extracted by the n-gram extraction program 3100.

In the step 3205, the program 141a sorts the occurrence frequencies of the n-grams acquired in the step 3204 in a descending order and extracts a predetermined number of n-grams from the top as characteristic strings.

The processing procedure of the characteristic string extraction program 141a has been explained above.

The processing procedure of the characteristic string extraction program 141a shown in FIG. 32 will be explained in connection with a specific example.

FIG. 33 shows an example of how to extract characteristic strings from the aforementioned document 1 of " . . . 。携帯電話 の使用時 のマナーが 問題になる。 . . . ". It is assumed in this example that n in n-gram has a value of 2 and two 2-grams are extracted from each single character type string as featured n-grams.

The program 141a first extracts single character type strings " . . . ", "。", "携帯電話", "の", "使用時", "の", "が", "問題", "になる", "。" and " . . . " from the document 1.

The program 141a then extracts all 2-grams by shifting these single character type strings by every one character from the head character therein, and sorts occurrence frequencies of the 2-grams in a descending order. For example, the program 141a extracts three 2-grams "携帯", "帯電" and "電話" from the single character type string "携帯電話" and acquires occurrence frequencies thereof in the database. As a result, the program 141a acquires 道の駅と 5,283), 呼ばれる, 462) and サービス 269). In this case, 道の駅と 5,282) indicates that an occurrence frequency of the 2-gram "電話" in the database is 5,283.

Next the program 141a extracts upper two of the 2-grams in each single character type string as featured n-grams. Since 道の駅と 5,283) and 呼ばれる 462) are upper two for the single character type string "携帯電話", the program 141a extracts "電話" and "携帯" as characteristic strings.

The specific processing example of the characteristic string extraction program 141a has been explained above.

As has been explained in the foregoing, in accordance with the present embodiment, since the occurrence information file 151 and occurrence probability file 152 are not used and the occurrence frequency file 153 is instead used, characteristic strings accurately reflecting actual occurrence circumstances in the database can be extracted.

In the present embodiment, the processing procedure of the n-gram extraction program 3100 has been explained in connection with the case where all n-grams having a predetermined length of n are extracted while shifting each single character type string by every one character from the head character. However, any number of n-grams in the single character type string may be extracted, or m-grams (m being an integer of 1 or more) in the single character type string may be extracted. Further, the length n of n-grams to be extracted has been predetermined. However, the value of n may be changed according to the length of the single character type string or according to the type of the single character type string. Furthermore, since the n-gram extracting technique of the present invention can extract n-grams indicative of features of a document, this technique can be applied also to calculation of a vector indicative of features of a document using n-grams or to sorting of documents using n-grams.

In accordance with the present invention, characteristic strings can be extracted while lessening erroneous division. As a result, even when the system performs its relevant document searching operation without looking up the word dictionary, the system can search with use of meaningful character strings, thus realizing searching of a relevant document or documents less shifted from the main concept.

What is claimed is:

1. A method for extracting words contained in document data specified by a user comprising the steps of:

extracting a substring from said document data and looking up word boundary probability information at a head or tail of a previously-prepared partial character string to calculate division probablities at at least two character positions, wherein said word boundary probability information is used to determine a likely position a compound word should be divided; and comparing the division probabilities calculated in said extracting step at at least two or more character positions to determine a division point in the word in the specified text.

2. A method for extracting words contained in document data specified by a user comprising the steps of:

extracting a substring from said document data and looking up word boundary probability information at a head or tail of a previously-prepared partial character string to calculate division probabilities at at least two character positions; and comparing the division probabilities calculated in said extracting step at at least two or more character positions to determine a division point in the word in the specified text, wherein said comparing step is replaced by a step of comparing the division probabilities calculated in said extracting step at at least two or more character positions to determine a division probability in a word in the specified text.

3. A method for extracting words contained in document data specified by a user comprising the steps of:

extracting a substring from said document data and looking up word boundary probability information at a head or tail of a previously-prepared partial character string to calculate division probabilities at at least two character positions; and comparing the division probabilities calculated in said extracting step at at least two or more character positions to determine a division point in the word in the specified text, wherein said extracting step is replaced by a step of extracting a substring from said specified text and looking up a probability that said substring is adjacent to a boundary of a predetermined character type at a head or tail of a previously-prepared substring to calculate a division probability of the characterposition.

4. A relevant document searching method comprising the steps of:
- extracting one or more words from a text, which will be referred to as specified text, of a sentence or document, which will be referred to collectively as a document, specified by a user in a text database storing character data as code data therein;
- counting occurrence frequencies of the words extracted in said word extracting step in the specified text;
- acquiring occurrence frequencies of the words extracted in said word extracting step in document texts which will be referred to as registration texts, stored in said text database;
- calculating similarities of the registration texts to the specified text in accordance with a predetermined calculation expression with use of the occurrence frequencies counted in said occurrence frequency counting step as well as the occurrence frequencies acquired in said occurrence frequency acquiring step; and
- outputting the similarities of the registration texts to the specified text calculated in said similarity calculating step as a searched result,
- wherein said word extracting step comprises the steps of:
  - extracting a substring from said specified text and looking up word boundary probability information at a head or tail of a previously-prepared partial character string and to calculate division probabilities at at least two character positions, and
  - comparing the division probabilities calculated in said extracting a substring step at at least two or more character positions to determine a division point in the word in the specified text.

5. A relevant document searching method as set forth in claim 4, wherein said comparing the division probabilities step is replaced by a step of comparing the division probabilities calculated in said division probability calculating step at at least two character positions to determine a division probability in a word in the specified text.

6. A relevant document searching method as set forth in claim 4, wherein said extracting a substring step is replaced by a step of extracting a substring from said specified text and looking up a probability that said substring is adjacent to a boundary of a predetermined character type at a head or tail of a previously-prepared substring to calculate a division probability of a character position.

7. A relevant document searching method as set forth in claim 6, further comprising the steps of:
- extracting a substring at a boundary of a redetermined character type in the registration text;
- calculating a possibility that said substring is adjacent to the character type boundary at a head or tail thereof and storing the possibility in a corresponding character type boundary probability file to register a document in a text database; and
- looking up said character type boundary probability file to acquire a possibility that the substring is adjacent to a boundary of a predetermined character type at the character position.

8. A system for extracting a word from a sentence or document, which will be referred to collectively as a document, specified by a user, comprising:
- means for extracting a substring from a text, which will be referred to as specified text, of the document specified by the user and looking up word boundary possibility information at a head or tail of a previously-prepared substring with respect to the extracted substring to calculate division probabilities at at least two character positions,
- wherein said word boundary possibility information is used to determine a likely position a compound word should be divided; and
- means for comparing the division probabilities at at least two character positions calculated in said means for extracting a substring to determine a division point of a word in the specified text.

9. A system for extracting a word from a sentence or document, which will be referred to collectively as a document, specified by a user, comprising:
- means for extracting a substring from a text, which will be referred to as specified text, of the document specified by the user and looking up word boundary possibility information at a head or tail of a previously-prepared substring with respect to the extracted substring to calculate a division probability at a character position; and
- means for comparing the division probabilities at at least two character positions calculated in said means for extracting a substring to determine a division point of a word in the specified text,
- wherein said means for comparing is replaced by means for comparing the division probabilities calculated in said means for extracting a substring at at least two or more character positions to determine a division probability in a word in the specified text.

10. A system for extracting a word from a sentence or document, which will be referred to collectively as a document, specified by a user, comprising:
- means for extracting a substring from a text, which will be referred to as specified text, of the document specified by the user and looking up word boundary possibility information at a head or tail of a previously-prepared substring with respect to the extracted substring to calculate division probabilities at at least two character positions; and
- means for comparing the division probabilities at at least two character positions calculated in said means for extracting a substring to determine a division point of a word in the specified text,
- wherein said means for extracting a substring is replaced by means for extracting a substring from said specified text and looking up a probability that said substring is adjacent to a boundary of a predetermined character type at a head or tail of a previously-prepared substring to calculate a division probability of the character position.

11. A relevant document searching system comprising:
- means for extracting one or more words from a text, which will be referred to as a specified text, of a sentence or document, which will be referred to collectively as a document, specified by a user in a text database storing character data as code data therein;
- means for counting occurrence frequencies of the words extracted in said word extracting means in the specified text;
- means for acquiring occurrence frequencies of the words extracted in said word extracting means in document texts, which will be referred to as registration texts, stored in said text database;

means for calculating similarities of the registration texts to the specified text in accordance with a predetermined calculation expression with use of occurrence frequencies counted in said occurrence frequency counting means as well as occurrence frequencies acquired in said occurrence frequency acquiring means; and means for outputting the similarities of the registration texts to the specified text calculated in said similarity calculating means as a searched result, wherein said word extracting means comprises:
means for extracting a substring from said specified text and looking up word boundary probability information at a head or tail of a previously-prepared partial character string to calculate division probabilities at at least two character positions, and means for comparing the division probabilities calculated in said means for extracting a substring at at least two character positions to determine a division point in the word in the specified text.

12. A relevant document searching system as set forth in claim 11, wherein said word division point judging means is replaced by means for comparing the division probabilities calculated in said division probability calculating means at at least two or more character positions to determine a division probability in a word in the specified text.

13. A relevant document searching system as set forth in claim 11, wherein said means for extracting a substring is replaced by means for extracting a substring from said specified text and looking up a probability that said substring is adjacent to a boundary of a predetermined character type at a head or tail of a previously-prepared substring to calculate a division probability of the character position.

14. A relevant document searching system as set forth in claim 13, further comprising:
means for extracting a substring at a boundary of a predetermined character type in the registration text, calculating a possibility that said substring is adjacent to the character type boundary at a head or tail thereof, and storing the possibility in a corresponding character type boundary probability file to register a document in a text database; and means for looking up said character type boundary probability file to acquire a possibility that the substring is adjacent to a boundary of a predetermined character type at the character position.

15. A storage medium for storing a program, executable by a computer, for extraction of a word from a sentence or document, which will be referred to collectively as a document, specified by a user, said program when executed causes said computer to perform the steps of:
extracting a substring from a text which will be referred to as specified text, of the document specified by the user and looking up word boundary possibility information at a head or tail of a previously-prepared substring with respect to the extracted substring to calculate division probabilities at at least two character positions, wherein said word boundary possibility information is used to determine a likely position a compound word should be divided; and comparing the division probabilities at at least two character positions calculated in said division probability calculating step to determine a division point of a word in the specified text.

16. A storage medium for storing a relevant document search program, said program when executed by a computer causes the computer to perform the steps of:
extracting one or more words from a text, which will be referred to as specified text, of a sentence or document, which will be referred to collectively as a document, specified b y a user in a text database storing character data as code data therein;

counting occurrence frequencies of the words extracted in said word extracting step in the specified text;

acquiring occurrence frequencies of the words extracted in said word extracting step in document texts, which will be referred to as registration texts, stored in said text database;

calculating similarities of the registration texts to the specified text in accordance with a predetermined calculation expression with use of occurrence frequencies counted in said occurrence frequency counting step as well as occurrence frequencies acquired in said occurrence frequency acquiring step; and outputting the similarities of the registration texts to the specified text calculated in said similarity calculating step as a searched result, wherein said word extracting step comprises the steps of:
extracting a substring from said specified text and looking up word boundary probability information at a head or tail of a previously-prepared partial character string to calculate division probabilities at at least two character positions, and comparing the division probabilities calculated in said extracting a substring step at at least two character positions to determine a division point in the word in the specified text.

17. A word extracting method as set forth in claim 1, wherein a probability that a substring having a predetermined length starting or ending at a specific character position appears adjacent to a character set boundary is used as said word boundary probability information.

18. A method for extracting characteristic string from a document including a text, comprising the steps of:
extracting a candidate string which is a candidate of a word starting or ending at an inter-word boundary from the text;

calculating a division probability that the extracted candidate string is divided at a position in the candidate string and repeating the calculation with respect to a plurality of positions;

comparing the division probabilities with one another and dividing the candidate string into substrings at the position having the high division probability determined by said comparing step; and extracting at least one of the substrings as the characteristic string.

19. A characteristic string extracting method according to claim 18, wherein said division probability calculating step further comprises the steps of:
obtaining a first probability that a n-gram (n is an integer equal to or larger than 1) ending at the position is a word tail or an independent word;

obtaining a second probability that m-gram (m is an integer equal to or larger than 1) starting at the position is a word head or an independent word;

multiplying the first probability by the second probability to obtain a product and determining the product as the division probability at the position.

20. A method for searching a text database storing documents for a document relevant to a user specified document, comprising the steps of:

detecting a inter-word boundary from a text in the user specified document and extracting a candidate string which is a candidate of a word starting or ending at the inter-word boundary from the text;

calculating a division probability that the extracted candidate string is divided at a position in the candidate string and repeating the calculating with respect to a plurality of positions;

comparing the division probabilities with one another and dividing the candidate string into substrings at the position having the high division probability determined by the comparing step;

extracting at least one of the substrings as the characteristic string;

counting occurrence frequency of the extracted characteristic string in the text;

obtaining occurrence frequency of the extracted characteristic string in each document in the text database;

calculating a similarity between the text and each document using the characteristic string occurrence frequency in the text and the characteristic string occurrence frequency in each document; and outputting the similarity as a search result.

21. A relevant document search method according to claim 20, further comprising the step of:

registering the document in the text database, wherein the document registering step includes the steps of:

detecting a inter-word boundary from a text in the document and extracting a string which is a candidate of a word starting or ending at the inter-word boundary from the text;

extracting all n-grams, wherein n is equal to or larger than 1 and equal to or smaller than m, and where m is the length of the extracted string, from the extracted string; and storing a pair of an identification number of the document and an occurrence frequency of the n-gram in the text into an occurrence frequency file with the n-gram, wherein said occurrence frequency obtaining step includes the step of:

referring to said occurrence frequency file to obtain the occurrence frequency of the characteristic string in each document.

22. A relevant document search method according to claim 21, wherein said inter-word boundary in a character set boundary.

* * * * *